United States Patent
Harada et al.

(10) Patent No.: US 11,745,485 B2
(45) Date of Patent: Sep. 5, 2023

(54) EPOXY RESIN COMPOSITION FOR CARBON-FIBER-REINFORCED COMPOSITE MATERIALS, PREPREG, AND CARBON-FIBER-REINFORCED COMPOSITE MATERIAL

(71) Applicant: Mitsubishi Chemical Corporation, Tokyo (JP)

(72) Inventors: Yukihiro Harada, Tokyo (JP); Atsushi Nohara, Tokyo (JP)

(73) Assignee: Mitsubishi Chemical Corporation, Tokyo (JP)

( * ) Notice: Subject to any disclaimer, the term of this patent is extended or adjusted under 35 U.S.C. 154(b) by 0 days.

(21) Appl. No.: 17/072,110

(22) Filed: Oct. 16, 2020

(65) Prior Publication Data

US 2021/0032425 A1 Feb. 4, 2021

Related U.S. Application Data

(63) Continuation of application No. PCT/JP2019/011914, filed on Mar. 20, 2019.

(30) Foreign Application Priority Data

Apr. 23, 2018 (JP) ................. 2018-082501

(51) Int. Cl.
*C08J 5/24* (2006.01)
*C08L 63/00* (2006.01)
*B32B 27/38* (2006.01)

(52) U.S. Cl.
CPC .............. *B32B 27/38* (2013.01); *C08J 5/243* (2021.05); *C08J 5/248* (2021.05); *C08L 63/00* (2013.01); *B32B 2262/106* (2013.01); *C08J 2363/00* (2013.01); *C08J 2463/00* (2013.01)

(58) Field of Classification Search
CPC ...... C08J 5/24; C08J 2363/00; C08J 2463/00; B32B 27/38; B32B 2262/106; C08L 63/00; C08G 59/50
See application file for complete search history.

(56) References Cited

U.S. PATENT DOCUMENTS

| 5,025,045 | A | 6/1991 | Gawin et al. |
| 5,910,456 | A | 6/1999 | Matsuhisa et al. |
| 2014/0000580 | A1 | 2/2014 | Wang et al. |
| 2016/0122528 | A1 | 5/2016 | Kobayashi et al. |
| 2017/0306117 | A1 | 10/2017 | Fuse et al. |
| 2018/0134837 | A1 | 5/2018 | Furukawa et al. |
| 2020/0010634 | A1 | 1/2020 | Harada |

FOREIGN PATENT DOCUMENTS

| EP | 0366068 A2 | 5/1990 |
| EP | 0486044 A2 | 5/1992 |
| EP | 3214103 A1 | 9/2017 |
| JP | 2225517 A | 9/1990 |
| JP | 4268361 A | 9/1992 |
| JP | 2006291093 A | 10/2006 |
| JP | 2015527462 A | 9/2015 |
| WO | WO-9621695 A1 | 7/1996 |
| WO | WO-2015019965 A1 | 2/2015 |
| WO | WO-2016067736 A1 | 5/2016 |
| WO | WO-2016204173 A1 | 12/2016 |
| WO | WO-2018174250 A1 | 9/2018 |

OTHER PUBLICATIONS

International Search Report dated Jun. 18, 2019 PCT/JP2019/011914 (with English translation), 4 pages.
Extended European Search Report dated May 19, 2021 in Patent Application No. 19792448.3, 6 pages.
Office Action dated May 24, 2022 in Japanese Patent Application No. 2020-516114 (with English translation obtained from Global Dossier), 4 pages.

*Primary Examiner* — Callie E Shosho
*Assistant Examiner* — Bethany M Miller
(74) *Attorney, Agent, or Firm* — Element IP, PLC

(57) ABSTRACT

An epoxy resin composition for carbon-fiber-reinforced composite material includes (A) a bisphenol F-type epoxy resin that is liquid at 25° C., (B) a polyfunctional amine-type epoxy resin, and (C) 3,3'-Diaminodiphenyl sulfone. With respect to 100 parts by mass of the entire epoxy resin in the epoxy resin composition, the content of component (A) is 40 to 60 parts by mass, the content of component (B) is 30 to 45 parts by mass, and the total content of components (A) and (B) is 85 to 100 parts by mass. The content of component (C) satisfies $1.04 \leq x/y \leq 1.35$, where x is a molar number of active hydrogen atoms in the amine of component (C) and y is a molar number of all epoxy groups in the epoxy resin composition.

15 Claims, 1 Drawing Sheet

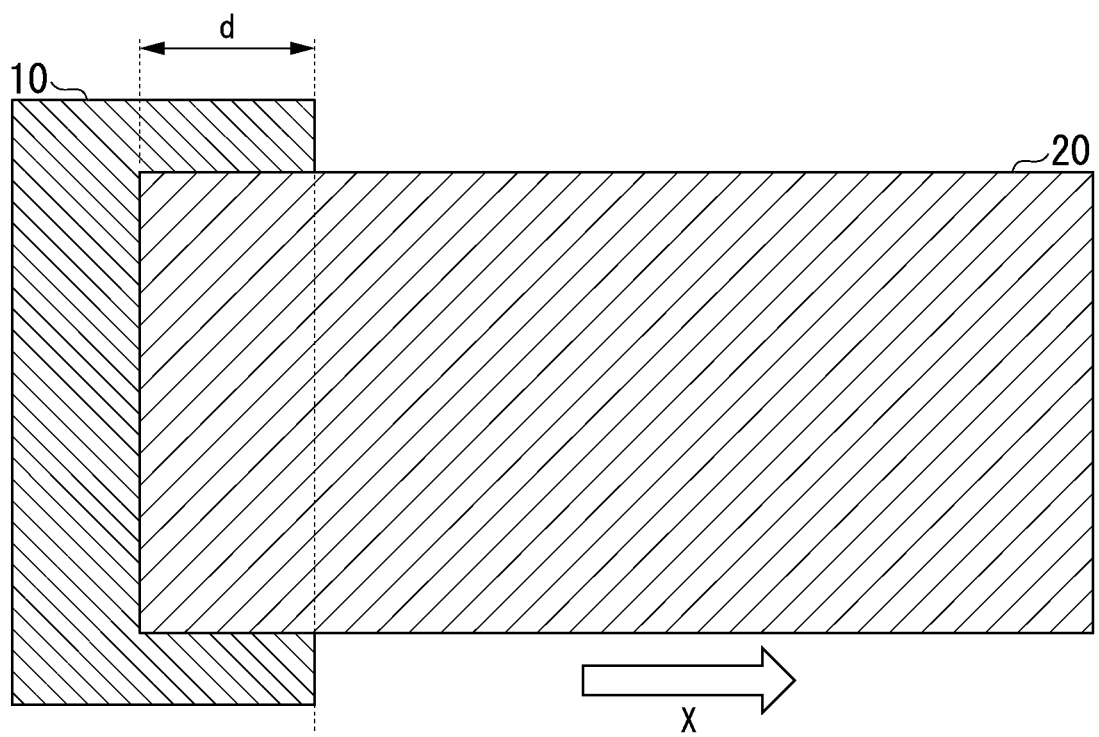

EPOXY RESIN COMPOSITION FOR CARBON-FIBER-REINFORCED COMPOSITE MATERIALS, PREPREG, AND CARBON-FIBER-REINFORCED COMPOSITE MATERIAL

This application is a continuation application of International Application No. PCT/JP2019/011914, filed on Mar. 20, 2019, which claims the benefit of priority of the prior Japanese Patent Application No. 2018-082501 filed in Japan on Apr. 23, 2018, the content of which is incorporated herein by reference.

TECHNICAL FIELD

The present invention relates to an epoxy resin composition for a carbon-fiber-reinforced composite material, a prepreg, and a carbon-fiber-reinforced composite material.

BACKGROUND ART

Carbon-fiber-reinforced composite materials are lightweight and have high strength and high stiffness and are thus broadly used in the sports and leisure field, the automotive field, the aircraft field, other general industrial fields, and the like. In recent years, carbon-fiber-reinforced composite materials that are more lightweight and have higher strength and higher stiffness have been frequently used in the automotive field, the aircraft field, and the like.

A carbon-fiber-reinforced composite material is a material including a carbon fiber and a matrix resin as essential components. The carbon-fiber-reinforced composite material is an anisotropic material that is extremely high in strength and elastic modulus in the fiber axis direction of the carbon fiber, but is low in strength and elastic modulus in the direction perpendicular to the carbon fiber axis direction.

The carbon-fiber-reinforced composite material is manufactured by, for example, laminating prepregs, each of the prepregs being obtained by impregnating a carbon-fiber base material with an unhardened thermosetting resin composition, heating and forming the laminated prepregs, and hardening the thermosetting resin composition. In the manufacturing of the carbon-fiber-reinforced composite material, the physical properties in individual directions of the carbon-fiber-reinforced composite material, which is an anisotropic material, are controlled by using prepregs for which fabrics of carbon fibers are used or by laminating prepregs in which carbon fibers are arranged in one direction with the fiber axis directions of the prepregs combined in different directions.

However, the carbon-fiber-reinforced composite materials tend to be poor in compressive strength in the fiber direction in comparison with tensile strength in the fiber direction. Therefore, in the case of being used as the structural materials of aircraft or the like, the carbon-fiber-reinforced composite materials are more strongly demanded to be excellent in compression characteristics, in particular, to be excellent in compression characteristics at high temperatures in a moisture absorption state when a compression test is carried out in a high-temperature environment on a carbon-fiber composite material that has absorbed moisture. In addition, it is also considered important that the difference between the compression characteristics at room temperature in a non-moisture absorption state and the compression characteristics at high temperatures in a moisture absorption state be small.

As carbon-fiber-reinforced composite materials that are excellent in compression characteristics at high temperatures in a moisture absorption state, for example, carbon-fiber-reinforced composite materials described below have been proposed.

(1) A carbon-fiber-reinforced composite material in which the compression characteristics at high temperatures in a moisture absorption state are improved by increasing the elastic modulus and decreasing the water absorption rate of the matrix resin (Patent Document 1).

(2) An epoxy resin composition, a prepreg, and a fiber-reinforced composite material that have a high glass transition temperature even when absorbing moisture (Patent Document 2).

(3) A fiber-reinforced composite material having both interlaminar toughness of mode I in which the fine particles of a polyamide are disposed in the interlaminar region and compressive strength in a hot and humid environment (Patent Document 3).

CITATION LIST

Patent Literature

Japanese Unexamined Patent Application, First Publication No. Hei WO1996/21695
Japanese Unexamined Patent Application, First Publication No. Hei WO2016/204173
Japanese Unexamined Patent Application, First Publication No. Hei WO2015/019965

SUMMARY OF INVENTION

Technical Problem

The carbon-fiber-reinforced composite material (1) is a carbon-fiber-reinforced composite material in which the compression characteristics at high temperatures in a moisture absorption state are improved by increasing the elastic modulus and decreasing the water absorption rate of the matrix resin. However, in the carbon-fiber-reinforced composite material (1), as the matrix resin, a cyanate ester resin, a mixture or preliminary reaction product of a maleimide resin and a cyanate ester resin, or a glycidyl amine-type epoxy resin having three or more glycidyl groups in one molecule is used. Regarding the cyanate ester resin or the mixture or preliminary reaction product of a maleimide resin and a cyanate ester resin, the hardened product thereof has a high elastic modulus and a low water absorption rate, but has a problem with toughness becoming significantly poor.

Additionally, regarding the glycidyl amine-type epoxy resin having three or more glycidyl groups in one molecule, the hardened product thereof has a high elastic modulus, and furthermore, has excellent toughness compared with the hardened product of the cyanate ester resin or the mixture or preliminary reaction product of a maleimide resin and a cyanate ester resin, but the water absorption rate increases, which leads to a huge difference between the characteristics at room temperature in a non-moisture absorption state and the characteristics at high temperatures in a moisture absorption state.

The fiber-reinforced composite material (2) includes a specific epoxy resin such as a tri- or higher functional binaphthalene-type epoxy resin and thereby maintains a high glass transition temperature even when absorbing moisture. However, the water absorption amount of the fiber-reinforced composite material (2) is large and is not satisfactory in keeping the difference between the characteristics at room temperature in a non-moisture absorption state and the characteristics at high temperatures in a moisture absorption state small. Additionally, the hardened product of the resin does not have an elastic modulus high enough for the excellent compression characteristics of the fiber-reinforced composite material.

In the fiber-reinforced composite material (3), a polyfunctional epoxy resin or diglycidyl aniline is used as the matrix resin, thereby improving the elastic modulus of the matrix resin. However, the elastic modulus of the carbon-fiber-reinforced composite material (3) is not high enough for excellent compression characteristics of the fiber-reinforced composite material. Additionally, the water absorption rate is also high and is thus not satisfactory in keeping the difference between the characteristics at room temperature in a non-moisture absorption state and the characteristics at high temperatures in a moisture absorption state small.

One aspect of the present invention provides an epoxy resin composition for a carbon-fiber-reinforced composite material that enables the obtainment of a carbon-fiber-reinforced composite material in which the compression characteristics at high temperatures in a moisture absorption state are excellent and the difference between the compression characteristics at room temperature in a non-moisture absorption state and the compression characteristics at high temperatures in a moisture absorption state is small.

One aspect of the present invention provides a prepreg that enables the obtainment of a carbon-fiber-reinforced composite material in which the compression characteristics at high temperatures in a moisture absorption state are excellent and the difference between the compression characteristics at room temperature in a non-moisture absorption state and the compression characteristics at high temperatures in a moisture absorption state is small.

One aspect of the present invention provides a carbon-fiber-reinforced composite material in which the compression characteristics at high temperatures in a moisture absorption state are excellent and the difference between the compression characteristics at room temperature in a non-moisture absorption state and the compression characteristics at high temperatures in a moisture absorption state is small.

Solution to Problem

As a result of intensive studies for solving the above-described problem, the inventors of the present invention found that, in an epoxy resin composition including a component (A), a component (B), and a component (C) described below, when the molar number of active hydrogen atoms in an amine that the component (C) includes and the molar number of all epoxy groups included in the epoxy resin composition are set in specific ranges, the above-described problem can be solved. Furthermore, the inventors of the present invention found that, when the amount of the component (B) is set in a certain range, the effect of the present invention can be developed on a high level and completed the present invention.

Component (A): Bisphenol F-type epoxy resin that is liquid at 25° C.
Component (B): Polyfunctional amine-type epoxy resin
Component (C): 3,3'-Diaminodiphenyl sulfone The present invention has the following aspects.

<1> An epoxy resin composition including: a component (A), a component (B), and a component (C), in which a sum of a content of the component (A) and a content of the component (B) is 85 to 100 parts by mass with respect to 100 parts by mass of all epoxy resins included in the epoxy resin composition, the content of the component (A) is 40 to 60 parts by mass with respect to 100 parts by mass of all of the epoxy resins included in the epoxy resin composition, the content of the component (B) is 30 to 45 parts by mass with respect to 100 parts by mass of all of the epoxy resins included in the epoxy resin composition, and a content of the component (C) is an amount satisfying Expression (1).

Component (A): Bisphenol F-type epoxy resin that is liquid at 25° C.
Component (B): Polyfunctional amine-type epoxy resin
Component (C): 3,3'-Diaminodiphenyl sulfone $1.04 \leq x/y \leq 1.35$   Expression (1)

In Expression (1), x is a molar number of active hydrogen atoms in an amine in the component (C), and y is a molar number of all epoxy groups in the epoxy resin composition.

<2> The epoxy resin composition for a carbon-fiber-reinforced composite material according to <1>, in which the x/y is 1.31 or less.

<3> The epoxy resin composition for a carbon-fiber-reinforced composite material according to <1> or <2>, in which a hardened product of the epoxy resin composition has a water absorption rate of 3.3% or less.

<4> The epoxy resin composition for a carbon-fiber-reinforced composite material according to any one of <1> to <3>, in which the component (B) is at least one polyfunctional amine-type epoxy resin selected from the group consisting of tetraglycidyl diaminodiphenylmethane and triglycidyl aminophenol.

<5> The epoxy resin composition for a carbon-fiber-reinforced composite material according to any one of <1> to <4>, in which the component (B) is a mixture of triglycidyl aminophenol and tetraglycidyl diaminodiphenylmethane.

<6> The epoxy resin composition for a carbon-fiber-reinforced composite material according to <5>, in which a mass ratio of triglycidyl aminophenol to tetraglycidyl diaminodiphenylmethane is 0/45 to 30/15.

<7> A carbon fiber prepreg including: the epoxy resin composition for a carbon-fiber-reinforced composite material according to any one of <1> to <6>; and a carbon fiber.

<8> A prepreg including: a component (A), a component (B), a component (C), and a component (D), in which a sum of a content of the component (A) and a content of the component (B) is 85 to 100 parts by mass with respect to 100 parts by mass of all epoxy resins included in an epoxy resin composition including the component (A), the component (B), and the component (C), the content of the component (A) is 40 to 60 parts by mass with respect to 100 parts by mass of all of the epoxy resins included in the epoxy resin composition, the content of the component (B) is 30 to 45 parts by mass with respect to 100 parts by mass of all of the epoxy resins included in the epoxy resin composition, and a content of the component (C) is an amount satisfying Expression (1).

Component (A): Bisphenol F-type epoxy resin that is liquid at 25° C.
Component (B): Polyfunctional amine-type epoxy resin
Component (C): 3,3'-Diaminodiphenyl sulfone
Component (D): Sheet-like carbon fiber base material.

$1.04 \leq x/y \leq 1.35$   Expression (1)

In Expression (1), x is a molar number of active hydrogen atoms in an amine in the component (C), and y is a molar number of all epoxy groups in the epoxy resin composition.

<9> The prepreg according to <8>, in which the x/y is 1.31 or less.

<10> The prepreg according to <8> or <9>, further including: a component (E),

Component (E): Thermoplastic resin particles.

<11> The prepreg according to <10>, in which a content of the component (E) is 5 to 25 parts by mass with respect to 100 parts by mass of the epoxy resin composition.

<12> The prepreg according to <10> or <11>, in which the component (E) is polyamide resin particles.

<13> The prepreg according to <12>, in which the polyamide resin particles have a melting point of 140° C. to 180° C.

<14> The prepreg according to <12>, in which the polyamide resin particles have a glass transition temperature of 140° C. to 180° C.

<15> The prepreg according to any one of <10> to <14>, in which the component (E) is unevenly distributed on a surface of the prepreg.

<16> A hardened product of a laminate in which two or more sheets of the prepreg according to any one of <8> to <15> are laminated.

<17> A carbon-fiber-reinforced composite material including: a component (A), a component (B), a component (C), a component (D), and a component (E), in which a sum of a content of the component (A) and a content of the component (B) is 85 to 100 parts by mass with respect to 100 parts by mass of all epoxy resins included in the epoxy resin composition including the component (A), the component (B), and the component (C), the content of the component (A) is 40 to 60 parts by mass with respect to 100 parts by mass of all of the epoxy resins included in the epoxy resin composition, the content of the component (B) is 30 to 45 parts by mass with respect to 100 parts by mass of all of the epoxy resins included in the epoxy resin composition, a content of the component (C) is an amount satisfying Expression (1), a plurality of sheets of the component (D) is laminated, and the component (E) is present between layers of the plurality of sheets of the component (D).

Component (A): Bisphenol F-type epoxy resin that is liquid at 25° C.
Component (B): Polyfunctional amine-type epoxy resin
Component (C): 3,3'-Diaminodiphenyl sulfone
Component (D): Sheet-like carbon fiber base material.
Component (E): Thermoplastic resin particles.

$$1.04 \leq x/y \leq 1.35 \quad \text{Expression (1)}$$

In Expression (1), x is a molar number of active hydrogen atoms in an amine in the component (C), and y is a molar number of all epoxy groups in the epoxy resin composition.

<18> The carbon-fiber-reinforced composite material according to <17>, in which the x/y is 1.31 or less.

That is, it can be said that the gist of the present invention lies in [1] to [13] below.

[1] An epoxy resin composition including a component (A), a component (B), and a component (C), which are described below, in which, in 100 parts by mass of epoxy resins included in the epoxy resin composition, the sum of the component (A) and the component (B) is 85 to 100 parts by mass, the component (A) is 40 to 60 parts by mass, the component (B) is 30 to 45 parts by mass, and the content of the component (C) is an amount satisfying Expression (1).

$$1.04 \leq \text{molar number of active hydrogen atoms in amine that component}(C) \text{ includes/molar number of all epoxy groups included in epoxy resin composition} \leq 1.31 \quad \text{Expression (1)}$$

Component (A): Bisphenol F-type epoxy resin that is liquid at 25° C.
Component (B): Polyfunctional amine-type epoxy resin
Component (C): 3,3'-Diaminodiphenyl sulfone

[2] The epoxy resin composition for a carbon-fiber-reinforced composite material according to [1], in which the hardened product of the epoxy resin composition has a water absorption rate of 3.3% or less.

[3] The epoxy resin composition for a carbon-fiber-reinforced composite material according to [1] or [2], in which the component (B) is made of tetraglycidyl diaminodiphenylmethane or triglycidyl aminophenol and tetraglycidyl diaminodiphenylmethane.

[4] The epoxy resin composition for a carbon-fiber-reinforced composite material according to [3], in which the ratio between triglycidyl aminophenol and tetraglycidyl diaminodiphenylmethane is 0:45 to 30:15 in terms of the mass ratio.

[5] A carbon fiber prepreg including a carbon fiber and the epoxy resin composition for a carbon-fiber-reinforced composite material according to any one of [1] to [4] as a matrix resin.

[6] A prepreg including a component (A), a component (B), a component (C), and a component (D), which are described below, in which, in 100 parts by mass of epoxy resins included in an epoxy resin composition including the component (A), the component (B), and the component (C), the sum of the component (A) and the component (B) is 85 to 100 parts by mass, the component (A) is 40 to 60 parts by mass, the component (B) is 30 to 45 parts by mass, and the content of the component (C) is an amount satisfying Expression (1).

$$1.04 \leq \text{molar number of active hydrogen atoms in amine that component}(C) \text{ includes/molar number of all epoxy groups included in epoxy resin composition} \leq 1.31 \quad \text{Expression (1)}$$

Component (A): Bisphenol F-type epoxy resin that is liquid at 25° C.
Component (B): Polyfunctional amine-type epoxy resin
Component (C): 3,3'-Diaminodiphenyl sulfone
Component (D): Sheet-like carbon fiber base material

[7] The prepreg according to [6], further including a component (E).

Component (E): Thermoplastic resin particles

[8] The prepreg according to [7], in which the amount of the component (E) blended is 5 to 25 parts by mass with respect to 100 parts by mass of the epoxy resin composition.

[9] The prepreg according to [7] or [8], in which the component (E) is polyamide resin particles.

[10] The prepreg according to [9], in which the polyamide resin particles have a melting point or glass transition temperature of 140° C. to 180° C.

[11] The prepreg according to any of [7] to [10], in which the component (E) is unevenly distributed on the surface of the prepreg.

[12] A hardened product of a laminate in which two or more sheets of the prepreg according to any one of [7] to [11] are laminated.

[13] A carbon-fiber-reinforced composite material including a component (A), a component (B), a component (C), a component (D), and a component (E), which are described below, in which, in 100 parts by mass of epoxy resins included in an epoxy resin composition including the component (A), the component (B), and the component (C), the sum of the component (A) and the component (B) is 85 to 100 parts by mass, the component (A) is 40 to 60 parts by mass, the component (B) is 30 to 45 parts by mass, the content of the component (C) is an amount satisfying Expression (1), a plurality of sheets of the component (D) is laminated, and the component (E) is present between the layers of the component (D).

$$1.04 \leq \text{molar number of active hydrogen atoms in amine that component}(C) \text{ includes/molar number of all epoxy groups included in epoxy resin composition} \leq 1.31 \quad \text{Expression (1)}$$

Component (A): Bisphenol F-type epoxy resin that is liquid at 25° C.
Component (B): Polyfunctional amine-type epoxy resin
Component (C): 3,3'-Diaminodiphenyl sulfone
Component (D): Sheet-like carbon fiber base material
Component (E): Thermoplastic resin particles Advantageous Effects of Invention According to one aspect of the present invention, an epoxy resin composition for a carbon-fiber-reinforced composite material is provided that enables the obtainment of a carbon-fiber-reinforced composite material in which the compression characteristics at high temperatures in a moisture absorption state are excellent and the difference between the compression characteristics at room temperature in a non-moisture absorption state and the compression characteristics at high temperatures in a moisture absorption state is small.

According to one aspect of the present invention, a prepreg is provided that enables the obtainment of a carbon-fiber-reinforced composite material in which the compression characteristics at high temperatures in a moisture absorption state are excellent and the difference between the compression characteristics at room temperature in a non-moisture absorption state and the compression characteristics at high temperatures in a moisture absorption state is small.

According to one aspect of the present invention, a carbon-fiber-reinforced composite material is provided in which the compression characteristics at high temperatures in a moisture absorption state are excellent and the difference between the compression characteristics at room temperature in a non-moisture absorption state and the compression characteristics at high temperatures in a moisture absorption state is small.

BRIEF DESCRIPTION OF DRAWING

FIG. 1 is a top view of a prepreg laminate used for the production of a formed plate for evaluation in an example.

DESCRIPTION OF EMBODIMENTS

The definitions of the following terms apply throughout the present specification and the claims.

An "epoxy resin" means a compound having two or more epoxy groups in the molecule.

An "epoxy resin composition for a carbon-fiber-reinforced composite material" is an epoxy resin composition that can be preferably used as a matrix resin of carbon-fiber-reinforced composite materials.

A "prepreg" is an intermediate material for the production of carbon-fiber-reinforced composite materials that is obtained by impregnating a carbon fiber base material with a resin composition such as an epoxy resin composition.

"To" used to indicate numerical ranges means that the numerical values described before and after "to" are included as the lower limit and the upper limit.

The content of "all epoxy resins included in the epoxy resin composition" is obtained by subtracting the total mass of components other than the epoxy resins from the total mass of the epoxy resin composition.

"x: Molar number of active hydrogen atoms in amine" is calculated as an active hydrogen atom equivalent, which is a value obtained by dividing the molar mass of an amine compound by the number of active hydrogen atoms included in one molecule of the amine compound.

"y: Molar number of all epoxy groups in epoxy resin composition" is calculated by the following method.

First, the epoxy equivalent of each epoxy resin included in the epoxy resin composition is measured by the method specified by JIS K 7236. The epoxy equivalent is the mass of the resin including one equivalent of epoxy groups. Next, the sum of the values obtained by dividing the mass of each epoxy resin included in the resin composition by the epoxy equivalent of each epoxy resin is calculated and regarded as y: molar number of all epoxy groups in epoxy resin composition.

In the present invention, the average value of the absolute maximum value and the minimum value of the epoxy equivalents disclosed by manufacturers of each epoxy resin can be adopted as the epoxy equivalent of the epoxy resin.

"The water absorption rate of the hardened product of the epoxy resin composition" is measured from the hardened product of an epoxy resin composition not including a component (E) by the following method.

1) A 2 mm-thick hardened plate of the epoxy resin composition is produced. During hardening of the epoxy resin composition, the epoxy resin composition is heated from room temperature to 180° C. at 1.7° C./minute, held at 180° C. for two hours, and then air-cooled to 50° C. or lower.

2) After the hardening, the hardened plate is processed to a test piece that is 12.7 mm in width and 55 mm in length within 24 hours.

3) Dirt on the hardened resin test piece is wiped off with acetone, and the mass of the hardened resin test piece before absorbing water is measured.

4) The hardened resin test piece is immersed in warm water (71° C.) for two weeks. When a plurality of test pieces is immersed, the test pieces are each wrapped with gauze so as to prevent the test pieces from coming into direct contact with each other.

5) The immersed hardened resin test piece is removed, water droplets are sufficiently wiped off, and the mass of the hardened resin test piece after absorbing water is measured.

6) The water absorption rate of the hardened product of the epoxy resin composition is calculated according to Expression (2).

$$(\text{Mass of hardened resin test piece after water absorption} - \text{mass of hardened resin test piece before water absorption})/\text{mass of hardened resin test piece before water absorption} \times 100\% \quad \text{Expression (2)}$$

"Being unevenly distributed" means that a large amount of the component (E) is present on the surface of the prepreg, and specifically, the concentration rate obtained by Expression (3) is 70% or more.

Concentration rate=(mass of component(E) present in interlaminar region)/(mass of component(E) present in interlaminar region+mass of component(E) in carbon fiber base material)×100  Expression (3)

The meanings of the following terms in the present specification are as described below.

"DSC" is an abbreviation for differential scanning calorimetry.

A "crystalline polyamide resin" means a resin having a melting point that appears in DSC.

An "amorphous polyamide resin" means a resin having a melting point that does not appear in DSC.

The "epoxy equivalent" means the number of grams of an epoxy resin including one gram equivalent of epoxy groups. The "epoxy equivalent" is measured by the method specified in JIS K7236.

The "average particle diameter" means the particle diameter (D50) corresponding to a cumulative frequency of 50% in a volume-based cumulative distribution obtained by the measurement of a particle diameter distribution.

The "interlaminar fracture toughness" means the threshold limit value of energy necessary for the occurrence of interlaminar exfoliation and cracking around the unit area.

"GIC" means the mode I interlaminar fracture toughness value in the initial stage of crack growth.

"GIIC" means the mode II interlaminar fracture toughness value in the initial stage of crack growth.

The "mode I" means an (opening-type) distortion mode in which the direction of crack opening displacement is perpendicular to individual crack surfaces.

The "mode II" means a (sliding shear-type) distortion mode in which the direction of crack opening displacement is parallel to crack surfaces and perpendicular to crack tips.

The "crack opening displacement" refers to the relative displacement of the upper and lower surfaces of a crack.

The "viscosity" is a value measured at a desired temperature by rotating a parallel plate while keeping stress constant using a rheometer.

"G'-Tg Dry" means the glass transition temperature of the hardened product of the epoxy resin composition in a non-water absorption state.

"G'-Tg Wet" means the glass transition temperature of the hardened product of the epoxy resin composition in a water absorption state.

The "glass transition temperature" is the midpoint glass transition temperature obtained from a DSC curve measured by the following method. First, a non-crystalline resin is heated from room temperature to a temperature approximately 30° C. higher than the estimated glass transition temperature at 10° C./minute and held at the temperature approximately 30° C. higher than the estimated glass transition temperature for 10 minutes. Next, the non-crystalline resin is rapidly cooled to a temperature approximately 50° C. lower than the estimated glass transition temperature. The non-crystalline resin is then heated to a temperature approximately 30° C. higher than the estimated glass transition temperature at 20° C./min. At the transition spot of the base line associated with the glass transition temperature on the obtained DSC curve, the glass transition temperature is determined at a point at which a straight line equally distant in the vertical axis direction from the straight line extending from the low temperature-side baseline and from the straight line extending the high temperature-side baseline and the curve in the transition part of the baseline intersect each other.

The "melting point" is the melting peak temperature on the DSC curve of a crystalline resin measured by the following method. First, the crystalline resin is heated from room temperature to a temperature approximately 30° C. higher than the estimated melting point at 10° C./minute and held at the temperature approximately 30° C. higher than the estimated melting point for 10 minutes. Next, the crystalline resin is cooled to a temperature approximately 50° C. lower than the estimated melting point at 10° C./min. The crystalline resin is then heated to a temperature approximately 30° C. higher than the estimated melting point at 10° C./min.

An epoxy resin composition for a carbon-fiber-reinforced composite material according to one aspect of the present invention develops the effect of the present invention when used as a matrix resin for a carbon-fiber-reinforced composite material. An epoxy resin composition for a carbon-fiber-reinforced composite material of the present invention is an epoxy resin composition including a component (A), a component (B), and a component (C), which are described below, in which, with respect to 100 parts by mass of epoxy resins included in the epoxy resin composition, the sum of the component (A) and the component (B) is 85 to 100 parts by mass, the component (A) is 40 to 60 parts by mass, the component (B) is 30 to 45 parts by mass, and the content of the component (C) is an amount satisfying Expression (1).

1.04≤molar number of active hydrogen atoms in amine that component(C) includes/molar number of all epoxy groups included in epoxy resin composition≤1.35  Expression (1)

Component (A): Bisphenol F-type epoxy resin that is liquid at 25° C.

Component (B): Polyfunctional amine-type epoxy resin

Component (C): 3,3'-Diaminodiphenyl sulfone

A prepreg according to one aspect of the present invention is a prepreg including a component (A), a component (B), a component (C), and a component (D), which are described below, in which, with respect to 100 parts by mass of epoxy resins included in an epoxy resin composition including the component (A), the component (B), and the component (C), the sum of the component (A) and the component (B) is 85 to 100 parts by mass, the component (A) is 40 to 60 parts by mass, the component (B) is 30 to 45 parts by mass, and the content of the component (C) is an amount satisfying Expression (1).

1.04≤molar number of active hydrogen atoms in amine that component(C) includes/molar number of all epoxy groups included in epoxy resin composition≤1.35  Expression (1)

Component (A): Bisphenol F-type epoxy resin that is liquid at 25° C.

Component (B): Polyfunctional amine-type epoxy resin

Component (C): 3,3'-Diaminodiphenyl sulfone

Component (D): Sheet-like carbon fiber base material

A hardened product of a laminate according to one aspect of the present invention is a hardened product of a laminate in which two or more sheets of the prepreg are laminated.

A carbon-fiber-reinforced composite material according to one aspect of the present invention is a carbon-fiber-reinforced composite material including a component (A), a component (B), a component (C), a component (D), and a component (E), which are described below, in which, with respect to 100 parts by mass of epoxy resins included in an epoxy resin composition including the component (A), the component (B), and the component (C), the sum of the component (A) and the component (B) is 85 to 100 parts by mass, the component (A) is 40 to 60 parts by mass, the component (B) is 30 to 45 parts by mass, the content of the component (C) is an amount satisfying Expression (1), a plurality of sheets of the component (D) is laminated, and the component (E) is present between the layers of the component (D).

$$1.04 \leq \text{molar number of active hydrogen atoms in amine that component}(C) \text{ includes/molar number of all epoxy groups included in epoxy resin composition} \leq 1.35 \quad \text{Expression (1)}$$

Component (A): Bisphenol F-type epoxy resin that is liquid at 25° C.
Component (B): Polyfunctional amine-type epoxy resin
Component (C): 3,3'-Diaminodiphenyl sulfone
Component (D): Sheet-like carbon fiber base material
Component (E): Thermoplastic resin particles <Epoxy Resin Composition for Carbon-Fiber-Reinforced Composite Materials>

The epoxy resin composition for a carbon-fiber-reinforced composite material of the present invention includes the component (A), the component (B), and the component (C). The epoxy resin composition for a carbon-fiber-reinforced composite material of the present invention may further include optional components other than the component (A), the component (B), and the component (C) as long as the effect of the present invention is not impaired.

The sum of the component (A) and the component (B) is 85 to 100 parts by mass with respect to 100 parts by mass of the epoxy resins included in the epoxy resin composition for a carbon-fiber-reinforced composite material. That is, the epoxy resin composition of the present invention may include, as an epoxy component, 15 parts by mass or less of an epoxy resin other than the component (A) and the component (B) with respect to 100 parts by mass of the epoxy resins. When the proportion of the sum of the component (A) and the component (B) in the epoxy resins in the epoxy resin composition of the present invention is too low, there is a case where it becomes impossible to maintain the water absorption rate of the hardened product of the epoxy resin composition at a low level, and furthermore, to favorably maintain the toughness of the hardened product of the epoxy resin composition. With respect to 100 parts by mass of the epoxy resins included in the epoxy resin composition of the present invention, the sum of the component (A) and the component (B) is preferably 90 to 100 parts by mass and more preferably 95 to 100 parts by mass.

(Component (A))

The component (A) is a bisphenol F-type epoxy resin that is liquid at 25° C. Being liquid at 25° C. specifically means that the viscosity of the resin measured at 25° C. is 10 Pa·s or less. In addition, the epoxy equivalent of the bisphenol F-type epoxy resin that is liquid at 25° C. is 155 to 180 g/eq. Examples of the commercially available products of the bisphenol F-type epoxy resin that is liquid at 25° C. include jER® 806 and 807 manufactured by Mitsubishi Chemical Corporation, D. E. R.® 354 manufactured by The DOW Chemical Company, EPOTOHTO® YD-170 manufactured by Nippon Steel Chemical & Material Co., Ltd., EPICLON® 830 manufactured by DIC Corporation, and the like.

The content of the bisphenol F-type epoxy resin that is liquid at 25° C. is 40 to 60 parts by mass, preferably 50 to 60 parts by mass, and more preferably 55 to 60 parts by mass with respect to 100 parts by mass of the epoxy resins included in the epoxy resin composition for a carbon-fiber-reinforced composite material of the present invention. When 40 parts by mass or more of the bisphenol F-type epoxy resin that is liquid at 25° C. is included, it is possible to sufficiently improve the elastic modulus and toughness of the hardened product of the matrix resin without increasing the water absorption rate of the hardened product of the matrix resin. In addition, when the amount is set to 60 parts by mass or less, it is possible to sufficiently improve the elastic modulus and toughness of the hardened product of the matrix resin while favorably maintaining the glass transition temperature of the hardened product of the matrix resin.

(Component (B))

The component (B) is a polyfunctional amine-type epoxy resin. Being polyfunctional means that four or more epoxy groups are included in one molecule. In addition, the amine-type epoxy resin is an epoxy resin including glycidylamine in the molecule, and examples thereof include aminophenol-type epoxy resins represented by triglycidyl aminophenol, aromatic amine-type epoxy resins represented by tetraglycidyl diaminodiphenylmethane, and the like. As the polyfunctional amine-type epoxy resin of the present invention, it is possible to preferably use triglycidyl aminophenol or tetraglycidyl di aminodiphenylmethane. Examples of the commercially available products of triglycidyl aminophenol include ARALDITE® MY0500, MY0510, MY0600, and MY0610 manufactured by Huntsman Corporation, and jER® 630 manufactured by Mitsubishi Chemical Corporation, and the like. In addition, examples of the commercially available products of tetraglycidyl diaminodiphenylmethane include jER® 604 manufactured by Mitsubishi Chemical Corporation, ARALDITE® MY720 manufactured by Huntsman Corporation, YH434L manufactured by Nippon Steel Chemical & Material Co., Ltd., and the like.

The content of the polyfunctional amine-type epoxy resin is 30 to 45 parts by mass, preferably 35 to 45 parts by mass, and more preferably 40 to 45 parts by mass with respect to 100 parts by mass of the epoxy resins included in the epoxy resin composition for a carbon-fiber-reinforced composite material of the present invention. When 30 parts by mass or more of the polyfunctional amine-type epoxy resin is included, it is possible to improve the heat resistance of the hardened product of the epoxy resin composition. When 45 parts by mass or less of the polyfunctional amine-type epoxy resin is included, it is possible to maintain the water absorption rate of the hardened product of the epoxy resin composition at a low level, and furthermore, to favorably maintain the toughness of the hardened product of the epoxy resin composition.

As the polyfunctional amine-type epoxy resin, it is possible to preferably use triglycidyl aminophenol or tetraglycidyl diaminodiphenylmethane. Only triglycidyl aminophenol or only tetraglycidyl diaminodiphenylmethane may be used, or tetraglycidyl diaminodiphenylmethane and triglycidyl aminophenol may be used in combination.

The polyfunctional amine-type epoxy resin is preferably a mixture of triglycidyl aminophenol and tetraglycidyl diaminodiphenylmethane.

In this case, the content of tetraglycidyl diaminodiphenylmethane is preferably 30 to 45 parts by mass with respect to 100 parts by mass of the epoxy resins included in the epoxy resin composition for a carbon-fiber-reinforced composite material of the present invention. The content of triglycidyl aminophenol is preferably 0 to 30 parts by mass with respect to 100 parts by mass of the epoxy resins included in the epoxy resin composition for a carbon-fiber-reinforced composite material of the present invention.

In this case, the mass ratio of triglycidyl aminophenol to tetraglycidyl diaminodiphenylmethane is preferably 0/45 to 30/15, more preferably 0/45 to 15/30, and further preferably 0/45 to 5/40.

In a case where the polyfunctional amine-type epoxy resin is a mixture of triglycidyl aminophenol and tetraglycidyl diaminodiphenylmethane, when the mass ratio is the above-described lower limit value or more, the elastic modulus and glass transition temperature of the hardened product of the epoxy resin composition increase.

In a case where the polyfunctional amine-type epoxy resin is a mixture of triglycidyl aminophenol and tetraglycidyl diaminodiphenylmethane, when the mass ratio is the above-described upper limit value or less, the water absorption rate of the hardened product of the epoxy resin composition decreases.

The amount of triglycidyl aminophenol and tetraglycidyl diaminodiphenylmethane blended is in a range of 30 to 45 parts by mass of the amount of the polyfunctional amine-type epoxy resin blended. In particular, blending of triglycidyl aminophenol, which is a meta form, enables an improvement in the heat resisting properties and elastic modulus of the hardened product of the epoxy resin composition, but extremely increases the water absorption rate of the hardened product of the epoxy resin composition. Tetraglycidyl diaminodiphenylmethane is capable of improving the heat resistance and elastic modulus of the hardened product of the epoxy resin composition, although not as much as triglycidyl aminophenol, which is a meta form, and is capable of preventing the water absorption rate of the hardened product of the epoxy resin composition from being increased as much as with triglycidyl aminophenol, which is a meta form. That is, blending of triglycidyl aminophenol enables an improvement in the heat resistance and elastic modulus of the hardened product of the epoxy resin composition, and, when 30 parts by mass or less of triglycidyl aminophenol is blended, it is possible to improve the heat resistance and elastic modulus of the hardened product of the epoxy resin composition while preventing an increase in the water absorption rate of the hardened product of the epoxy resin composition. When 30 parts by mass or more of tetraglycidyl diaminodiphenylmethane is blended, it is possible to improve the heat resistance of the hardened product of the epoxy resin composition. When 45 parts by mass or less of tetraglycidyl diaminodiphenylmethane is included, it is possible to maintain the water absorption rate of the hardened product of the epoxy resin composition at a low level, and furthermore, to favorably maintain the toughness of the hardened product of the epoxy resin composition. That is, the ratio between triglycidyl aminophenol to tetraglycidyl diaminodiphenylmethane is preferably 0:45 to 30:15 in terms of mass ratio.

(Epoxy Resin Other than Component (A) and Component (B))

The epoxy resin composition for a carbon-fiber-reinforced composite material of the present invention may also include an epoxy resin other than the component (A) and the component (B). Specific examples of the other epoxy resin include a bisphenol A-type epoxy resin, an epoxy resin having an oxazolidone ring skeleton, a novolac-type epoxy resin, a hydrophthalic acid-type epoxy resin, a bisphenol S-type epoxy resin, a resorcin-type epoxy resin, a hydroquinone-type epoxy resin, a bisphenoxyethanol fluorene-type epoxy resin, a bisphenol fluorene-type epoxy resin, a biscresol fluorene-type epoxy resin, and the like. Among them a bisphenol A-type epoxy resin that is liquid at 25° C. is preferred because the bisphenol A-type epoxy resin has a low viscosity, is useful for adjusting the handleability of the epoxy resin composition, and is capable of decreasing the water absorption rate of the hardened product of the epoxy resin composition without affecting the heat resisting properties or elastic modulus of the hardened product of the epoxy resin composition.

Examples of the commercially available products of the bisphenol A-type epoxy resin that is liquid at 25° C. include jER® 828 manufactured by Mitsubishi Chemical Corporation, D. E. R.® 331 manufactured by The Dow Chemical Company, EPOTOHTO® YD-128 manufactured by Nippon Steel Chemical & Material Co., Ltd., EPICLON® 850 manufactured by DIC Corporation, and the like.

The amount of blended bisphenol A-type epoxy resin that is liquid at 25° C. is preferably 0 to 15 parts by mass, more preferably 3 to 10 parts by mass, and still more preferably 4 to 8 parts by mass with respect to 100 parts by mass of the epoxy resins contained in the epoxy resin composition for a carbon-fiber-reinforced composite material of the present invention. Blending of the bisphenol A-type epoxy resin that is liquid at 25° C. enables a decrease in the water absorption rate of the hardened product of the epoxy resin composition. In addition, when 15 parts by mass or less of the bisphenol A-type epoxy resin that is liquid at 25° C. is blended, it is possible to favorably maintain the heat-resisting properties or elastic modulus of the hardened product of the epoxy resin composition.

(Component (C))

The component (C) is 3,3'-diaminodiphenyl sulfone. 3,3'-Diaminodiphenyl sulfone is included in the epoxy resin composition for a carbon-fiber-reinforced composite material of the present invention as a hardening agent for the epoxy resins. Examples of the commercially available products of 3,3'-diaminodiphenyl sulfone include Aradur® 9719-1 manufactured by Huntsman Corporation, 3,3'-DAS (3,3'-diaminodiphenyl sulfone) manufactured by Konishi Chemical Inc Co., Ltd., and the like.

The content of the component (C) is an amount that satisfies Expression (1).

$$1.04 \leq x/y \leq 1.35 \qquad \text{Expression (1)}$$

In Expression (1), x is the molar number of active hydrogen atoms in an amine in the component (C), and y is the molar number of all epoxy groups in the epoxy resin composition.

In Expression (1), x can also be referred to as the molar number of active hydrogen atoms in 3,3'-diaminodiphenyl sulfone. Similarly, in Expression (1), y can also be referred to as the molar number of all epoxy groups included in the epoxy resin composition for a carbon-fiber-reinforced composite material of the present invention.

That is, the amount of 3,3'-diaminodiphenyl sulfone blended is an amount at which the ratio between the molar number of all epoxy groups included in the epoxy resin composition for a carbon-fiber-reinforced composite material of the present invention and the molar number of active hydrogen atoms in 3,3'-diaminodiphenyl sulfone (hereinafter, also referred to as the "equivalent ratio") satisfies Expression (1). As the amount of 3,3'-diaminodiphenyl sulfone blended increases, the elastic modulus of the hardened product of the epoxy resin composition increases, and the water absorption rate decreases. On the other hand, the heat-resisting properties of the hardened product of the epoxy resin composition degrade. That is, when the ratio between the molar number of all epoxy groups included in the epoxy resin composition for a carbon-fiber-reinforced composite material of the present invention and the molar number of active hydrogen atoms in 3,3'-diaminodiphenyl sulfone is 1.04 or more, it is possible to improve the elastic modulus of the hardened product of the epoxy resin composition and decrease the water absorption rate. Furthermore, from the viewpoint of the capability of improving the elastic modulus of the hardened product of the epoxy resin composition and decreasing the water absorption rate, the molar ratio is more preferably 1.07 or more and still more preferably 1.12 or more. When the ratio between the molar number of all epoxy groups included in the epoxy resin composition for a carbon-fiber-reinforced composite material of the present invention and the molar number of active hydrogen atoms in 3,3'-diaminodiphenyl sulfone is 1.35 or less, it is possible to favorably maintain the heat-resisting properties of the hardened product of the epoxy resin composition. Furthermore, from the viewpoint of the capability of favorably maintaining the heat-resisting properties of the hardened product of the epoxy resin composition, the molar ratio is more preferably 1.31 or less, still more preferably 1.29 or less, and particularly preferably 1.27 or less.

(Component (E))

Component (E) described below: In the production of a prepreg containing thermoplastic resin particles, it is possible to uniformly dispose the component (E) in the prepreg, and, from the viewpoint of enhancing the effect of the blending of the component (E) for imparting toughness to carbon-fiber-reinforced composite materials, it is preferable to contain the thermoplastic resin particles in the epoxy resin composition for a carbon-fiber-reinforced composite material in advance. That is, the epoxy resin composition for a carbon-fiber-reinforced composite material of the present invention preferably further includes the component (E).

As the component (E), only one kind of thermoplastic resin particles may be used, or two or more kinds of different thermoplastic resin particles may be used.

The component (E) is a particulate thermoplastic resin. Examples of the thermoplastic resin as the component (E) include polyacetal, polyethylene terephthalate, polyester, polyamide, polyurethane, polyether sulfone, polyether imide, polycarbonate, polyimide, polyvinyl formal, copolymers thereof, and the like. From the viewpoint of the capability of preferably imparting toughness to the carbon-fiber-reinforced composite material, a polyamide is more preferred. The polyamide is not particularly limited as long as the polyamide has an amide bond in the repeating structure. The polyamide may be polyamide particles of one kind of polyamide or polyamide particles of two or more kinds of polyamides. In the case of polyamide particles of two or more kinds of polyamide resins, each polyamide resin may be uniformly present in the particles or may be unevenly present as in layer structures. The polyamide can be obtained by, for example, the ring-opening polymerization of lactams, the polycondensation of a diamine and dicarboxylic acid, the polycondensation of aminocarboxylic acid, or the like. Specific examples of the polyamide resin include polyamide resins including an aromatic ring or an alicycle such as Nylon 6, Nylon 46, Nylon 66, Nylon 11, Nylon 12, Nylon 610, Nylon 612, Nylon 6T, Nylon 6I, Nylon 9T, Nylon MST, TROGAMID® T5000 and TROGAMID® CX7323 by Daicel-Evonik Ltd., and the like.

In addition, any of a crystalline polyamide resin and an amorphous polyamide resin can be preferably used, and any of the crystalline polyamide resin and the amorphous polyamide resin may be used singly or both resins may be used in combination. The melting point in the case of a crystalline polyamide or the glass transition temperature in the case of the amorphous polyamide is preferably in a range of 100° C. to 180° C., more preferably in a range of 120° C. to 180° C., and still more preferably 140° C. to 180° C. When the melting point or the glass transition temperature is in the above-described range, the effect of the blending of the component (E) for imparting toughness to the carbon-fiber-reinforced composite material is enhanced.

Examples of the commercially available products of the polyamide include VESTOSINT series (VESTOSINT® 2158, VESTOSINT® 2159, and the like) manufactured by Daicel-Evonik Ltd., GRILAMIDE® TR90NZ and GRILAMIDE® TR55 manufactured by EMS-Chemie Ltd., TOROGAMID® CX7323 and TOROGAMID® T5000 manufactured by Daicel-Evonik Ltd, and the like.

The thermoplastic resin particles as the component (E) may have any shape as long as the thermoplastic resin particles are particulate, but are preferably spherical and more preferably truly spherical. As the shape becomes closer to a true sphere, the effect of the blending of the component (E) for imparting toughness to the carbon-fiber-reinforced composite material is enhanced.

The average particle size of the component (E) is preferably 8 to 60 µm, more preferably 10 to 45 µm, and still more preferably 15 to 35 µm. When the average particle diameter is 60 µm or less, a problem of the thermoplastic resin particles becoming clogged stuck in a coating machine at the time of thinly applying the epoxy resin composition for a carbon-fiber-reinforced composite material into which the component (E) is blended to produce a prepreg to exfoliate paper or the like does not easily occur, and furthermore, the straightness of a carbon fiber is not easily decreased at the time of producing a carbon-fiber-reinforced composite material. In addition, when the average particle diameter is 8 µm or more at the time of impregnating the component (D) described below with the epoxy resin composition for a carbon-fiber-reinforced composite material into which the component (E) is blended to produce a prepreg, the thermoplastic resin particles do not enter the component (D) and are likely to be filtered out on the surface of the component (D). As the number of thermoplastic resin particles that are filtered out and present in the vicinity of the surface of the component (D) increases, the effect of the blending of the component (E) for imparting toughness to the carbon-fiber-reinforced composite material is enhanced.

The amount of the component (E) blended is preferably 5 to 25 parts by mass, more preferably 10 to 25 parts by mass, and still more preferably 12 to 20 parts by mass with respect to 100 parts by mass of the epoxy resins included in the epoxy resin composition for a carbon-fiber-reinforced composite material of the present invention. When 5 parts by mass or more of the component (E) is included, it is possible to impart high toughness to the carbon-fiber-reinforced composite material. When 30 parts by mass or less of the component (E) is included, it is possible to prevent the deterioration of the handleability of the epoxy resin composition for a carbon-fiber-reinforced composite material or the deterioration of the tackiness of the prepreg.

(Random Components)

As other components that can be included in the epoxy resin composition for a carbon-fiber-reinforced composite material of the present invention, a variety of additives are exemplified.

Examples of the additives include a thermoplastic elastomer, elastomer fine particles, core-shell-type elastomer fine particles, a block copolymer including an acrylic resin or the like, a compound having one epoxy group in the molecule, a diluent, inorganic particles (silica or the like), a carbonaceous component (a carbon nanotube or the like), a flame retardant (a phosphorus compound or the like), an anti-foaming agent, and the like. From the viewpoint of improving the toughness without degrading the heat-resisting properties of the hardened product of the epoxy resin composition for a carbon-fiber-reinforced composite material, as the additives, it is preferable to blend core-shell-type elastomer fine particles or to dissolve a block copolymer including polyether sulfone, an acrylic resin, or the like in the epoxy resins.

Examples of the commercially available products of polyether sulfone include SUMIKAEXCEL 5003P manufactured by Sumitomo Chemical Company, Ultrason® E2020P manufactured by BASF, Virantage® VW-10200RP and VW-10700RP manufactured by Solvay SA, and the like. Polyether sulfone can be blended to the extent that the handleability of the epoxy resin composition for a carbon-fiber-reinforced composite material of the present invention or the drapability or tackiness of the prepreg is not impaired, and the amount of polyether sulfone blended is preferably 2 to 40 parts by mass, more preferably 5 to 30 parts by mass, and still more preferably 10 to 25 parts by mass with respect to 100 parts by mass of the epoxy resins.

Examples of the commercially available products of the core-shell-type elastomer fine particles include METABLENE® manufactured by Mitsubishi Chemical Corporation, STAFYROID manufactured by Aica Kogyo Co., Ltd., PARALOID® manufactured by The Dow Chemical Company, and the like.

The core-shell-type elastomer fine particles may be dispersed in an epoxy resin in advance. Examples of the commercially available products of the core-shell-type elastomer fine particle-dispersed epoxy resin include KANEACE® manufactured by Kaneka Corporation, ACRYSET® BP series manufactured by Nippon Shokubai Co., Ltd., and the like. The core-shell-type elastomer fine particle-dispersed epoxy resin is capable not only of facilitating the preparation of the component (B) but also of improving the dispersion state of the core-shell-type elastomer fine particles in the component (B) and is thus preferably used.

Examples of the commercially available products of the block copolymer including an acrylic resin or the like include Nanostrength® series manufactured by Arkema K.K., for example, Nanostrength® M52N and Nanostrength® M22N.

(Water Absorption Rate of Hardened Product of Epoxy Resin Composition)

The water absorption rate of the hardened product of the epoxy resin composition is significantly affected by the properties or amount blended of the component (E). In the present invention, the water absorption rate of the hardened product of the epoxy resin composition is the water absorption rate of the hardened product of the epoxy resin composition not including the component (E). The method described in the examples can be used for the measurement of the water absorption rate.

The water absorption rate of the hardened product of the epoxy resin composition is preferably 3.3% or less, more preferably 3.2% or less, and still more preferably 3.1% or less. When the water absorption rate of the hardened product of the epoxy resin composition is decreased, it is possible to decrease the difference between the compression characteristics of the carbon-fiber-reinforced composite material at room temperature in a non-moisture absorption state and the compression characteristics at high temperatures in a moisture absorption state, and it is possible to obtain a carbon-fiber-reinforced composite material having favorable compressive characteristics at high temperatures in a moisture absorption state. Furthermore, when the water absorption rate of the hardened product of the epoxy resin composition is decreased, it is possible to decrease the difference between the glass transition temperature of the carbon-fiber-reinforced composite material in a non-moisture absorption state and the glass transition temperature in a moisture absorption state, and it is possible to obtain a carbon-fiber-reinforced composite material having a favorable glass transition temperature even after absorbing moisture.

The epoxy resin composition for a carbon-fiber-reinforced composite material of the present invention can be applied to the production of a carbon fiber prepreg by impregnating a carbon fiber. The carbon fiber prepreg includes the epoxy resin composition for a carbon-fiber-reinforced composite material of the present invention and a carbon fiber. In the carbon fiber prepreg, the carbon fiber is impregnated with the epoxy resin composition for a carbon-fiber-reinforced composite material.

<Prepreg>

A prepreg of the present invention includes the component (A), the component (B), the component (C), and the component (D). The prepreg of the present invention preferably further includes the component (E). The prepreg of the present invention may further include a random component other than the component (A), the component (B), the component (C), and the component (D) as long as the effect of the present invention is not impaired.

Component (A): Bisphenol F-type epoxy resin that is liquid at 25° C.
Component (B): Polyfunctional amine-type epoxy resin
Component (C): 3,3'-Diaminodiphenyl sulfone
Component (D): Sheet-like carbon fiber base material The details and preferred aspects of the component (A), the component (B), and the component (C) are the same as the contents described in the above-described "epoxy resin composition for a carbon-fiber-reinforced composite material".

In the prepreg, the details and preferred aspects of the sum of the content of the component (A) and the content of the component (B) are the same as the contents described in the above-described "epoxy resin composition for a carbon-fiber-reinforced composite material".

In the prepreg, the details and preferred aspects of the content of the component (A) are the same as the contents described in the above-described "epoxy resin composition for a carbon-fiber-reinforced composite material".

In the prepreg, the details and preferred aspects of the content of the component (B) are the same as the contents described in the above-described "epoxy resin composition for a carbon-fiber-reinforced composite material".

In the prepreg, the details and preferred aspects of the content of the component (C) are the same as the contents described in the above-described "epoxy resin composition for a carbon-fiber-reinforced composite material".

(Component (D))

The component (D) is a sheet-like carbon fiber base material. From the viewpoint of the capability of forming a carbon-fiber-reinforced composite material having a high specific strength and a high specific elastic modulus, the component (D) is preferably a sheet made of bundles of carbon fibers in which the carbon fibers are paralleled in a single direction, and, from the viewpoint of easy handling, the component (D) is preferably a fabric of reinforcing fibers.

The carbon fiber may be a long fiber, and the long fiber may be in a strand form. In addition, the carbon fiber may be crushed (milled carbon fiber) or may be a long fiber or a long fiber in which strands are cut (chopped carbon fiber).

The tensile strength of the carbon fiber based on ASTM D4018 is preferably 3500 MPa or more, more preferably 5000 MPa or more, and still more preferably 6000 MPa or more. The tensile elastic modulus is preferably 150 GPa or more, more preferably 200 GPa or more, and still more preferably 250 GPa or more.

For example, in a case where the fiber-reinforced composite material according to one embodiment is used as a structural material for aircraft, the carbon fiber used for the fiber-reinforced composite material preferably has a high strand strength, and the strand strength based on JIS R 7601 of the carbon fiber is preferably 6000 MPa or more.

The fiber diameter of the carbon fiber is preferably 3 μm or more and preferably 12 μm or less. When the fiber diameter of the carbon fibers is 3 μm or more, in processes for processing the carbon fibers, for example, combing, rolling, or the like, it is unlikely that the carbon fibers laterally move and rub each other or, when the carbon fibers and the roll surface or the like rub each other, the carbon fibers are cut or fuzz piling occurs. Therefore, it is possible to preferably manufacture fiber-reinforced composite materials having a stable strength. In addition, when the fiber diameter of the carbon fiber is 12 μm or less, it is possible to manufacture the carbon fiber by an ordinary method.

The number of carbon fibers in the carbon fiber bundle is preferably 1,000 to 70,000.

The prepreg is an intermediate material for producing a carbon-fiber-reinforced composite material by impregnating the sheet-like carbon fiber base material as the component (D) with the above-described epoxy resin composition for a carbon-fiber-reinforced composite material. In a case where the interlaminar toughness is demanded to be higher than that of the carbon-fiber-reinforced composite material, the prepreg of the present invention preferably includes the component (E). In a case where the component (E) is included, the amount of the component (E) present in the vicinity of the surface of the prepreg is preferably 70 mass % or more, more preferably 80 mass % or more, and still more preferably 90 mass % or more.

The fiber areal weight (content of a reinforcing fiber per square meter: FAW) of the prepreg may be appropriately set depending on the use of the prepreg and is ordinarily 50 to 300 g/m$^2$.

The amount rate of the resins in the prepreg (the proportion of the total of the epoxy resin composition for a carbon-fiber-reinforced composite material and the component (E)) is preferably 20 to 50 mass % and more preferably 30 to 40 mass %. When the amount rate of the resins in the prepreg is the lower limit or more of the above-described range, it is possible to prevent the tackiness of the prepreg from becoming too low and to set the tackiness to be suitable for handling. Furthermore, it is also possible to prevent the degradation of the mechanical properties of the fiber-reinforced composite material attributed to the lack of the epoxy resin composition. When the amount rate of the resins in the prepreg is the upper limit or more of the above-described range, it is possible to prevent the tackiness of the prepreg from becoming too high and to set the tackiness to be suitable for handling. Furthermore, it is also possible to prevent the degradation of the mechanical properties of the fiber-reinforced composite material associated with an improvement in Vf (the volume percentage of the reinforcing fiber contained in the fiber-reinforced composite material) attributed to the excess of the epoxy resin composition.

The thickness of the prepreg may be appropriately set depending on the use of the prepreg. The thickness of the prepreg is ordinarily 0.05 to 0.3 mm.

(Component (E))

The component (E) is a particulate thermoplastic resin. The component (E) is preferably added from the viewpoint of imparting excellent interlaminar fracture toughness to the carbon-fiber-reinforced composite material obtained using the epoxy resin composition of the present invention. Examples of the component (E) of the present invention include thermoplastic resin particles made of polyacetal, polyethylene terephthalate, polyester, polyamide, polyurethane, polyether sulfone, polyether imide, polycarbonate, polyimide, polyvinyl formal, a copolymer thereof, or the like. Among these, polyamide particles are preferred from the viewpoint of imparting superior interlaminar fracture toughness to the carbon-fiber-reinforced composite material. The polyamide resin forming the polyamide particles is not particularly limited as long as the polyamide resin has an amide bond in the repeating structure. The polyamide resin may be polyamide resin particles of one kind of polyamide resin or may be polyamide resin particles of two or more kinds of polyamide resins. In the case of polyamide resin particles of two or more kinds of polyamide resins, each polyamide resin may be uniformly present in the particles or may be unevenly present as in layer structures. The polyamide resin can be obtained by, for example, the ring-opening polymerization of lactams, the polycondensation of a diamine and dicarboxylic acid, the polycondensation of aminocarboxylic acid, or the like. Specific examples of the polyamide resin include polyamide resins including an aromatic ring or an alicycle such as Nylon 6, Nylon 46, Nylon 66, Nylon 11, Nylon 12, Nylon 610, Nylon 612, Nylon 6T, Nylon 6I, Nylon 9T, Nylon MST, TROGAMID® T5000 and TROGAMID® CX7323 by Daicel-Evonik Ltd., and the like.

In addition, any of a crystalline polyamide resin and an amorphous polyamide resin can be preferably used. Any of the crystalline polyamide resin and the amorphous polyamide resin may be used singly or both resins may be used in combination. The polyamide particles are preferably crystalline copolymer nylon particles and more preferably spherical particles made of a copolymer of Nylon 12 and Nylon 6.

Examples of the commercially available products of the polyamide resin include VESTOSINT series (VESTOSINT® 2158, VESTOSINT® 2159, and the like) manufactured by Daicel-Evonik Ltd., GRILAMIDE® TR90NZ and GRILAMIDE® TR55 manufactured by EMS-Chemie Ltd., TOROGAMID® CX7323 and TOROGAMID® T5000 manufactured by Daicel-Evonik Ltd., and MW-330 manufactured by SC Environmental Science Co., Ltd., and the like.

In addition, the melting point and glass transition point of the polyamide particles are preferably 140° C. to 180° C. and more preferably 150° C. to 170° C. When the melting point of the polyamide particles is in the above-described range, the polyamide particles in the carbon fiber composite material sufficiently adhere to the matrix resin, whereby it is possible to impart superior interlaminar fracture toughness.

The average particle diameter of the component (E) is preferably 2 to 50 μm and more preferably 5 to 35 μm. When the average particle diameter of the component (E) is the lower limit or more of the above-described range, the component (E) does not easily enter carbon fiber bundles at the time of manufacturing the prepreg, and it is likely that a prepreg in which all of the component (E) described below is unevenly distributed on the surface of the prepreg. As a result, it is possible to impart superior interlaminar fracture toughness to the carbon-fiber-reinforced composite material. In addition, it is possible to prevent a significant increase in the viscosity when the component (E) is mixed into the epoxy resin composition of the present invention. When the average particle diameter of the component (E) is the upper limit or less of the above-described range, it is possible to prevent the component (E) from impairing the straightness of carbon fibers in the carbon-fiber-reinforced composite material. Therefore, it is possible to prevent the degradation of the mechanical properties of the carbon-fiber-reinforced composite material or it is possible to confine in the interlayer region a crack generated in the interlayer region of the carbon-fiber-reinforced composite material due to peeling stress in the out-of-plane direction. In addition, when the epoxy resin composition of the present invention including the component (E) is applied to the surface of exfoliate paper in a uniform thickness during the manufacturing of the prepreg, it is possible to prevent the occurrence of clogging in a facility such as a roll coater or a die coater.

The content of the component (E) is preferably 5 to 25 parts by mass, more preferably 10 to 25 parts by mass, and still more preferably 12 to 25 parts by mass with respect to 100 parts by mass of the epoxy resin included in the epoxy resin composition of the present invention. When the amount is the lower limit or more of the above-described range, the amount of the component (E) unevenly distributed in the interlaminar region sufficiently increases, and, for the above-described reason, it is possible to stably impart excellent interlaminar fracture toughness to the carbon-fiber-reinforced composite material. When the content of the component (E) is the upper limit or less of the above-described range, it is possible to prevent the amount of the epoxy resin composition excluding the component (E) in the epoxy resin composition that the prepreg includes from becoming too low. That is it is possible to prevent the degradation of the mechanical properties of the carbon-fiber-reinforced composite material attributed to the lack of the epoxy resin composition, or it is possible to prevent the viscosity of the epoxy resin composition from becoming too high and to sufficiently impregnate a carbon fiber bundle with the epoxy resin composition during the production of the prepreg.

The component (E) is preferably unevenly distributed on the surface of the prepreg from the viewpoint of more effectively imparting excellent interlaminar fracture toughness to the carbon-fiber-reinforced composite material.

That is, the concentration rate obtained by Expression (3) is preferably 70% or more.

Concentration rate=(mass of component(E) present in interlaminar region)/(mass of component(E) present in interlaminar region+mass of component(E) in carbon fiber base material)×100     Expression (3)

(Manufacturing Method of Prepreg not Including Component (E))

A prepreg not including the component (E) can be manufactured by, for example, the methods disclosed in Patent Documents 1 to 3, the application thereof, or the like. Specifically the prepreg not including the component (E) can be preferably manufactured by a wet method in which the epoxy resin composition for carbon fiber reinforcement of the present invention is dissolved in a solvent such as methyl ethyl ketone or methanol to decrease the viscosity, and the component (D) is impregnated with the solution, a hot melt method in which the epoxy resin composition for carbon fiber reinforcement of the present invention is heated to decrease the viscosity, and the component (D) is impregnated with the epoxy resin composition for carbon fiber reinforcement, or the like. From the viewpoint of the manufacture environment or the characteristics of a carbon-fiber-reinforced composite material produced from the prepreg, the hot melt method is preferred. As the hot melt method, there is a method in which the component (D) is directly impregnated with the epoxy resin composition for carbon fiber reinforcement having a viscosity decreased by heating or a method in which a resin film is produced by coating exfoliate paper or the like with the epoxy resin composition for carbon fiber reinforcement, and then the resin film is overlaid on one side or both sides of the component (D), heated, and pressurized, thereby obtaining the prepreg.

(Manufacturing Method of Prepreg Including Component (E))

A prepreg including the component (E) can be manufactured by, similar to the above-described manufacturing method of the prepreg not including the component (E), the methods disclosed in Patent Documents 1 to 3, the application thereof, or the like. From the viewpoint of the manufacture environment or the characteristics of a carbon-fiber-reinforced composite material produced from the prepreg, the hot melt method is preferred. More preferred is a method in which a resin film is produced by coating exfoliate paper or the like with the epoxy resin composition for carbon fiber reinforcement, and then the resin film is overlaid on one side or both sides of the component (D), heated, and pressurized, thereby obtaining the prepreg from the viewpoint of the quality of the prepreg or the characteristics of the carbon-fiber-reinforced composite material.

A specific manufacturing method of the prepreg including the component (E) is preferably one method selected from the group consisting of a method ($\alpha$), a method ($\beta$), a method ($\gamma$) and a method ($\delta$) since it is easy to dispose the component (E) in the vicinity of the surface of the prepreg, and it is possible to impart higher toughness to a carbon-fiber-reinforced composite material produced from the prepreg. The specific manufacturing method is more preferably the method ($\gamma$) or the method ($\delta$) since it is possible to more uniformly dispose the component (E) in the vicinity of the surface of the prepreg, and it is possible to prevent the fluttering of a large amount of the component (E) in a manufacturing process and the deterioration of the manufacturing environment.

Method ($\alpha$):

In the method ($\alpha$), a resin film (F1) made from the epoxy resin composition for carbon fiber reinforcement of the present invention is attached to one side or both sides of the component (D), and the component (D) is impregnated with the epoxy resin composition to produce a base prepreg (P1), and the component (E) is sprayed on one side or both sides of the base prepreg (P1). The resin film (F1) can be produced by applying the epoxy resin composition for carbon fiber reinforcement of the present invention to the surface of exfoliate paper or the like. Examples of the method for impregnating the component (D) with the epoxy resin composition include a method in which the component (D) is heated and pressurized with a heating press roll, and the like. The method for impregnating the component (D) with the epoxy resin composition is not limited to these exemplary examples.

Method ($\beta$):

In the method ($\beta$), the resin film (F1) made from the epoxy resin composition for carbon fiber reinforcement of the present invention is attached to one side or both sides of the component (D), the component (D) is impregnated with the epoxy resin composition to produce a base prepreg (P1), and a resin film (F2) including the component (E) sprayed on the surface of the epoxy resin composition is attached to one surface or both surfaces of the base prepreg (P1).

The resin film (F1) and the base prepreg (P1) can be produced in the same manner as in the method (α).

The resin film (F2) can be produced by applying the epoxy resin composition for carbon fiber reinforcement of the present invention to the surface of exfoliate paper or the like and spraying the component (E) on the surface.

Examples of the method for attaching the resin film (F2) to the base prepreg (P1) include methods such as a method in which the resin film and the base prepreg are heated and pressurized with a heating press roll. When the temperature is too high, the component (D) in the base prepreg (P1) is impregnated with a large amount of the epoxy resin composition included in the resin film (F2), the tackiness of the prepreg is almost lost, and there is a possibility that a problem may be caused during the manufacturing of the fiber-reinforced composite material. When the pressure is too high, a large amount of the component (E) included in the resin film (F2) enters the component (D) in the base prepreg (P1), and the straightness of the reinforcing fiber is impaired or the component (E) is almost lost on the surface of the component (D).

The epoxy resin composition included in the base prepreg (P1) and the epoxy resin composition included in the resin film (F2) may be the same resin composition or may be different epoxy resin compositions.

In consideration of the properties of the method (β) for further attaching the resin film (F2) to the base prepreg (P1), it is preferable to set the amount rate of the epoxy resin composition in the base prepreg (P1) to be lower than that in the method (α).

Method (γ):

In the method (γ), the resin film (F1) made from the epoxy resin composition for carbon fiber reinforcement of the present invention is attached to one side or both sides of the component (D), the component (D) is impregnated with the epoxy resin composition to produce a base prepreg (P1), and a resin film (F3) including the epoxy resin composition and the component (E) is attached to one surface or both surfaces of the base prepreg (P1).

The base prepreg (P1) can be produced in the same manner as in the method (α).

The resin film (F3) can be produced by applying a mixture of the epoxy resin composition and the component (E) to the surface of exfoliate paper or the like.

Examples of the method for attaching the resin film (F3) to the base prepreg (P1) include methods such as a method in which the resin film and the base prepreg are heated and pressurized with a heating press roll. When the temperature is too high, the component (D) in the base prepreg (P1) is impregnated with a large amount of the epoxy resin composition included in the resin film (F3), the tackiness of the prepreg is almost lost, and there is a possibility that a problem may be caused during the manufacturing of the fiber-reinforced composite material. When the pressure is too high, a large amount of the component (E) included in the resin film (F3) enters the component (D) in the base prepreg (P1), and the straightness of the reinforcing fiber is impaired or the component (E) is almost lost on the surface of the component (D).

The epoxy resin composition included in the base prepreg (P1) and the epoxy resin composition included in the resin film (F3) may be the same resin composition or may be different resin compositions.

In consideration of the properties of the method (γ) for further attaching the resin film (F3) to the base prepreg (P1), it is preferable to set the amount rate of the epoxy resin composition in the base prepreg (P1) to be lower than that in the method (α).

Method (δ):

In the method (δ), the resin film (F3) including the epoxy resin composition for carbon fiber reinforcement of the present invention and the component (E) is attached to one surface or both surfaces of the component (D), and the component (D) is impregnated with the epoxy resin composition.

The resin film (F3) can be produced in the same manner as in the method (γ).

The component (E) is filtered on the component (D), and the component (E) is unevenly distributed in the vicinity of the surface of the prepreg.

<Carbon-Fiber-Reinforced Composite Material>

A carbon-fiber-reinforced composite material of the present invention includes the component (A), the component (B), the component (C), the component (D), and the component (E).

Component (A): Bisphenol F-type epoxy resin that is liquid at 25° C.
Component (B): Polyfunctional amine-type epoxy resin
Component (C): 3,3'-Diaminodiphenyl sulfone
Component (D): Sheet-like carbon fiber base material
Component (E): Thermoplastic resin particles The details and preferred aspects of the component (A), the component (B), the component (C), the component (D), and the component (E) are the same as the contents described in the above-described "epoxy resin composition for a carbon-fiber-reinforced composite material" and "prepreg".

In the carbon-fiber-reinforced composite material, the details and preferred aspects of the sum of the content of the component (A) and the content of the component (B) are the same as the contents described in the above-described "epoxy resin composition for a carbon-fiber-reinforced composite material".

In the carbon-fiber-reinforced composite material, the details and preferred aspects of the content of the component (A) are the same as the contents described in the above-described "epoxy resin composition for a carbon-fiber-reinforced composite material".

In the carbon-fiber-reinforced composite material, the details and preferred aspects of the content of the component (B) are the same as the contents described in the above-described "epoxy resin composition for a carbon-fiber-reinforced composite material".

In the carbon-fiber-reinforced composite material, the details and preferred aspects of the content of the component (C) are the same as the contents described in the above-described "epoxy resin composition for a carbon-fiber-reinforced composite material".

In the carbon-fiber-reinforced composite material, a plurality of sheets of the component (D) is laminated. Additionally, the component (E) is present between the plurality of layers of the component (D). It can be said that, between the plurality of layers of the component (D), a layer is formed by arranging the particles of the component (E) that has been fused and solidified. "The component (E) that has been fused and solidified" can also be said to be a fused and solidified substance of the component (E).

The carbon-fiber-reinforced composite material of the present invention can be manufactured by, for example, a method (M1) and a method (M2) below.

Method (M1): A method in which the epoxy resin composition for a carbon-fiber-reinforced composite material of the present invention and a carbon fiber are heated and formed, and the epoxy resins are hardened.

Method (M2): A method in which two or more of prepregs of the present invention are laminated together, heated, and formed, and the epoxy resins are hardened.

The temperature during the heating and forming of the laminated prepregs is not particularly limited as long as the epoxy resin composition can be appropriately hardened at the temperature. The temperature during the heating and forming is, for example, preferably 170° C. to 190° C. from the viewpoint of the performance of a facility used for heating and forming, the properties of an auxiliary material, the characteristics of a carbon-fiber-reinforced composite material to be obtained, and the time necessary for hardening the epoxy resin composition. When the temperature during the heating and forming is 170° C. or higher, the component (B) sufficiently hardens, and it is possible to obtain a carbon-fiber-reinforced composite material having higher heat-resisting properties. When the temperature during the heating and forming is 190° C. or lower, it is possible to use a facility and an auxiliary material that are less expensive for the heating and forming.

Furthermore, in order to further strengthen the interface between the epoxy resin composition and the component (E) and to make it more difficult for a crack generated in the interlaminar region in the fiber-reinforced composite material to propagate to the interface between the component (D) and the epoxy resin composition, the epoxy resins are preferably hardened at a temperature that is the melting point or higher of the component (E) in a case where the component (E) is crystalline and at a temperature that is the glass transition temperature or higher of the component (E) in a case where the component (E) is amorphous.

The heating and forming time needs to be long enough to sufficiently harden the component (B) and needs to be suitable for a heating and forming method described below. In the case of an autoclave forming method, the heating and forming time is preferably one to four hours. When the heating and forming time is one hour or longer, the component (B) sufficiently hardens. When the heating and forming last for more than four hours, the manufacturing cost becomes higher.

Examples of the heating and forming method include an autoclave forming method, an oven forming method, a press forming method, and the like. As the heating and forming method, the autoclave forming method is preferred because it is possible to obtain a fiber-reinforced composite material having superior mechanical properties.

EXAMPLES

Hereinafter, the present invention will be specifically described with examples. The present invention is not limited to the following description.

<Measurement Methods>

($x$: Molar number of active hydrogen atoms in amine)

The molar number of active hydrogen atoms in an amine in a component (C): $x$ was calculated as an active hydrogen atom equivalent, which is a value obtained by dividing the molar mass of an amine compound by the number of active hydrogen atoms included in one molecule of the amine compound.

($y$: Molar number of all epoxy groups in epoxy resin composition)

The molar number of all epoxy groups in an epoxy resin composition was calculated by the following method.

First, the average value of the absolute maximum value and the minimum value of the epoxy equivalents disclosed by manufacturers who manufactured epoxy resins was regarded as the epoxy equivalent of an epoxy resin. Next, the sum of the values obtained by dividing the mass of each epoxy resin included in the epoxy resin composition by the epoxy equivalent of each epoxy resin was calculated and regarded as $y$: molar number of all epoxy groups in epoxy resin composition.

($x/y$)

The value of "$x$: molar number of active hydrogen atoms in amine" measured by the above-described method was divided by the value of "$y$: molar number of all epoxy groups in epoxy resin composition", thereby calculating ($x/y$).

(Concentration Rate of Component (E))

A 20 mm×20 mm test piece was cut out from a formed sheet for evaluation. The cross section of the test piece was polished using a polishing machine (REFINE-POLISHER APM-122, manufactured by Refine Tec Ltd.). A photograph of the cross section of the test piece magnified 500 times was obtained using a digital microscope (manufactured by KEYENCE Corporation, VHX-5000). From the photograph, a component (E) present in the interlaminar region between layers of a carbon fiber base material and the component (E) present in the carbon fiber base material were clipped off, the masses of the clipped-off photographs were measured, and the concentration rate was calculated from Expression (3).

$$\text{Concentration rate} = (\text{mass of component}(E) \text{ present in interlaminar region})/(\text{mass of component}(E) \text{ present in interlaminar region} + \text{mass of component}(E) \text{ in carbon fiber base material}) \times 100 \quad \text{Expression (3)}$$

(Water Absorption Rate of Hardened Product of Epoxy Resin Composition)

The water absorption rate of the hardened product of the epoxy resin composition was measured by the following method.

1) A 2 mm-thick hardened plate of the epoxy resin composition was produced. Regarding the hardening conditions of the epoxy resin composition, the epoxy resin composition was heated from room temperature to 180° C. at 1.7° C./minute, held at 180° C. for two hours, and air-cooled to 50° C. or lower.

2) After the hardening, the hardened plate was processed to a test piece that was 12.7 mm in width and 55 mm in length within 24 hours.

3) Dirt on the hardened resin test piece was wiped off with acetone, and the mass of the hardened resin test piece before absorbing water was measured.

4) The hardened resin test piece was immersed in warm water (71° C.) for two weeks. When a plurality of test pieces was immersed, the test pieces were each wrapped with gauze so as to prevent the test pieces from coming into direct contact with each other.

5) The immersed hardened resin test piece was removed, water droplets were sufficiently wiped off, and the mass of the hardened resin test piece after absorbing water was measured.

6) The water absorption rate of the hardened product of the epoxy resin composition was calculated according to Expression (2).

$$(\text{Mass of hardened resin test piece after water absorption} - \text{mass of hardened resin test piece before water absorption})/\text{mass of hardened resin test piece before water absorption} \times 100\% \quad \text{Expression (2)}$$

(Three-Point Bending Test of Hardened Product of Epoxy Resin Composition)

A 2 mm-thick hardened plate of the epoxy resin composition produced under the same conditions as the hardened plate for the measurement of the water absorption rate of the hardened product of the epoxy resin composition was processed to a test piece that was 60 mm in length and 8 mm in width. For the test piece, the bending characteristics (bending strength, bending elastic modulus, and fracture strain) were measured using an electromechanical universal material tester (manufactured by Instron) equipped with a three-point bending jig (tips of both an indenter and a support: 3.2 mmR, distance between supports: 16 times the thickness of the test piece) under the condition of a crosshead speed of 2 mm/min.

(Glass Transition Temperature of Hardened Product of Epoxy Resin Composition)

A 2 mm-thick hardened plate of the epoxy resin composition was produced under the same conditions as those for the hardened plate used for the measurement of the water absorption rate of the hardened product of the epoxy resin composition. The produced hardened plate was processed to a test piece that was 55 mm in length and 12.7 mm in width.

The storage elastic modulus G' in a torsion mode was measured under the conditions of a frequency of 1 Hz and a temperature-rising rate of 5° C./min using a dynamic viscoelasticity measuring instrument (manufactured by TA Instruments, ARES-RDA). The log G' was plotted against the temperature, and the temperature obtained from the intersection of the approximation straight line of a flat region before the transition of the log G' and the approximation straight line of a region in which the log G' transited was regarded as the glass transition point. The test piece for glass transition temperature measurement was caused to absorb moisture by the same method as in the measurement of the water absorption rate of the hardened product of the epoxy resin composition.

(Average Particle Diameter of Component (E))

The average particle diameter of resin particles was obtained as described below.

For the resin particles, the particle size distribution was measured using a laser scattering-type particle size measurement instrument (manufactured by Nikkiso Co., Ltd., Model: 7340 MICROTRAC FRA) to obtain a cumulative distribution. The particle diameter (D50) at which the volume-based cumulative frequency reached 50% in the cumulative distribution was regarded as the average particle diameter.

(Production of Formed Plate for 0° Compression Evaluation Made of Fiber-Reinforced Composite Material)

Six prepregs were laminated such that the fiber axis directions of reinforcing fibers were aligned. The laminated prepregs were tightly covered with a vacuum bag so as to include no gaps. The laminated prepregs were heated from room temperature to 185° C. at a temperature-rising rate of 1.7° C./min using an autoclave and held for two hours. The laminated prepregs were held in the autoclave at a temperature-lowering speed of 3° C./min to reach 50° C. or lower in temperature. The formed plate for evaluation was removed from the autoclave. The pressure in the autoclave was set to 0.6 MPa from the start of the heating through the removal.

(Measurement of 0° Compressive Strength)

For the formed plate for evaluation, the 0° compressive strength was measured using an electromechanical universal material tester (manufactured by Instron) based on SACMA SRM 1R-94.

(Production of Formed Plates for GIC and GIIC Evaluation Made of Fiber-Reinforced Composite Material)

Twenty prepregs were laminated such that the fiber axis directions X of the reinforcing fibers indicated by the thick arrows in FIG. 1 were aligned to obtain a prepreg laminate 20. Here, between a tenth prepreg and an eleventh prepreg, a 50 µm-thick long fluororesin film 10 was inserted such that the longitudinal direction of the fluororesin film became perpendicular to the fiber axis direction X of the reinforcing fibers. The width d of a part in which the fluororesin film 10 was inserted between the tenth prepreg and the eleventh prepreg was approximately 70 mm.

The prepreg laminate 20 was tightly covered with a vacuum bag so as to include no gaps. The prepreg laminate 20 was heated from room temperature to 185° C. at a temperature-rising rate of 1.7° C./min using an autoclave and held for two hours. The prepreg laminate 20 was held in the autoclave at a temperature-lowering speed of 3° C./min to reach 50° C. or lower in temperature. The formed plate for evaluation was removed from the autoclave. The pressure in the autoclave was set to 0.6 MPa from the start of the heating through the removal.

(Measurement of GIC)

For the formed plate for evaluation, GIC was measured using an electromechanical universal material tester (manufactured by Instron) based on ASTM D5528.

(Measurement of GIIC) For the formed plate for evaluation, GIIC was measured using an electromechanical universal material tester (manufactured by Instron) based on ASTM D7905.

<Raw Materials>

(Component (A))

jER807: Bisphenol F-type liquid-phase epoxy resin (manufactured by Mitsubishi Chemical Corporation, jER® 807).

(Component (B))

jER604: Tetraglycidyl di aminodiphenylmethane (Mitsubishi Chemical Corporation, jER® 604).

MY0510: Triglycidyl-p-aminophenol (manufactured by Huntsman Corporation, Araldite® MY0510).

MY0600: Triglycidyl-m-aminophenol (manufactured by Huntsman Corporation, Araldite® MY0600).

(Other epoxy resins)

jER828: Bisphenol A-type liquid-phase epoxy resin (manufactured by Mitsubishi Chemical Corporation, jER® 828).

TSR-400: Epoxy resin containing an oxazolidone ring skeleton (manufactured by DIC Corporation, EPICLON® TSR-400).

(Component (C))

Aradure 9719-1: 3,3'-Diaminodiphenyl sulfone (manufactured by Huntsman Corporation, Aradure® 9719-1).

(Component (C))

3,3'-DAS: 3,3'-Diaminodiphenyl sulfone (manufactured by Konishi Chemical Inc Co., Ltd., 3,3'-DAS).

(Other Hardening Agents)

SEIKACURE-S: 4,4'-Diaminodiphenyl sulfone (manufactured by Wakayama Seika Kogyo Co., Ltd., SEIKACURE-S).

(Random Components)

SUMIKAEXCEL 5003P: Polyether sulfone (manufactured by Sumitomo Chemical Company, SUMIKAEXCEL 5003P)

(Component (D))

Carbon fiber A: A carbon fiber bundle produced by the following manufacturing method (strand tensile strength:

6300 MPa, strand tensile elastic modulus: 290 GPa, and the number of carbon fibers: 18000).

(Manufacturing Method of Carbon Fiber A)

[Production of Acrylonitrile-Based Precursor Fiber Bundle]

An acrylonitrile-based polymer having a composition of 98 mass % of acrylonitrile and 2 mass % of methacrylic acid was dissolved in dimethylformamide to prepare 23.5 mass % of a spinning stock solution.

This spinning stock solution was spun from a spinneret having a diameter of 0.15 mm and 2000 discharge holes disposed therein to carry out dry-wet spinning. That is, the spinning stock solution was spun into the air, passed through an approximately 5 mm space, and then coagulated in a coagulating liquid filled with an aqueous solution that had a temperature adjusted to 10° C. and contained 79.0 mass % of dimethylformamide to pick up coagulated yarns.

Next, the coagulated yarns were stretched 1.1 times in the air and then stretched 2.5 times in a stretching tank filled with an aqueous solution that had a temperature adjusted to 60° C. and contained 35 mass % of dimethylformamide. After the stretching, the stepped fiber bundle containing the solvent was washed with clean water, and then stretched 1.4 times in hot water (95° C.).

Subsequently, an oil agent containing amino-modified silicone as a main component was imparted to the fiber bundle such that the amount of the oil agent reached 1.1 mass %, and the fiber bundle was dried and densified. The dried and densified fiber bundle was stretched 2.6 times in pressure steam of 0.4 MPa-G to further improve the orientation and further densify the fiber bundle, and then wound to obtain an acrylonitrile-based precursor fiber bundle. Next, six obtained fiber bundles were assembled to obtain a fiber bundle having 12,000 single fibers. The fineness of the single fiber in this fiber bundle was 0.9 dtex.

[Production of Carbon Fiber Bundle]

These acrylonitrile-based precursor fiber bundles were introduced into a flameproofing furnace in a state of being parallel to each other, and air heated to 220° C. to 280° C. was blown to the precursor fiber bundles to carry out a flameproofing treatment on the precursor fiber bundles, thereby obtaining a flameproof fiber bundle having a density of 1.350 g/cm$^3$. The stretching rate in the flameproofing treatment was set to 3%, and the flameproofing treatment time was set to 60 minutes.

Next, the flameproof fiber bundle was passed through a first carbonization furnace having a temperature gradient of 300° C. to 700° C. in nitrogen while being stretched by 3.5%. The temperature gradient was set to be linear. The treatment time was set to 1.5 minutes. Furthermore, a heat treatment was carried out in a nitrogen atmosphere using a second carbonization furnace having a temperature gradient of 1000° C. to 1350° C. to obtain a carbon fiber bundle. The stretching rate was set to −3.0%, and the treatment time was set to 1.5 minutes.

Subsequently, the carbon fiber bundle was caused to travel in a 10 mass % aqueous solution of ammonium bicarbonate, and an energization treatment was carried out between the carbon fiber bundle, which was used as a positive electrode, and the counter electrode such that the quantity of electricity reached 40 coulombs per gram of the carbon fiber to be treated. The carbon fiber bundle was washed with water and then dried in an atmosphere (140° C.) for 10 minutes.

Subsequently, the carbon fiber bundle was immersed in and passed through an immersion tank filled with an aqueous dispersion liquid of a sizing agent described below, then, dried in an atmosphere (140° C.) for 10 minutes, and then wound around a bobbin. At this time, the concentration of the sizing agent in the aqueous dispersion liquid of the sizing agent in the immersion tank was diluted and adjusted such that the adhesion amount of the sizing agent reached 0.2 mass %.

[Preparation of Aqueous Dispersion Liquid of Sizing Agent for Carbon Fiber]

Ion-exchange water was added to, as the main agent, the sizing agent for a carbon fiber in which 40 parts by mass of "jER828" manufactured by Mitsubishi Chemical Corporation, 20 parts by mass of "jER1001" manufactured by Mitsubishi Chemical Corporation, and 20 parts by mass of "PLURONIC F88" manufactured by ADEKA Corporation, as an emulsifier, were mixed, and an aqueous dispersion liquid of the sizing agent for a carbon fiber was obtained by phase inversion emulsification in which a homomixer was used. In addition, the concentration of the sizing agent in the aqueous dispersion liquid was adjusted to reach 40% by mass.

The carbon fiber bundle obtained as described above had a basis weight of 570 mg/m, a density of 1.81 g/cm$^3$, and a sizing agent adhesion rate of 0.2 mass %.

In addition, a tensile test of a strand test body of an epoxy resin-impregnated carbon fiber bundle produced using this carbon fiber bundle was carried out based on the method of ASTM D4018. The strand tensile strength was 6300 MPa, and the strand tensile elastic modulus was 290 GPa.

(Component (E))

VESTOSINT 2158: Polyamide 12 particles (manufactured by Daicel-Evonik Ltd., VESTOSINT® 2158 natural, melting point: 177° C., average particle diameter: 21 μm)

Example 1

(Preparation of Epoxy Resin Composition)

In a planetary mixer, 55 parts by mass of jER807, 35 parts by mass of jER604, 5 parts by mass of MY0510, 5 parts by mass of jER828, and 10 parts by mass of SUMIKAEXCEL 5003P were weighed. The jacket temperature of the planetary mixer was set to 140° C. to 160° C., and the contents were mixed until the contents became homogeneous. The contents were cooled to 60° C. or lower, and 54 parts by mass of Aradure 9719-1 was added to the planetary mixer. The jacket temperature was set to 55° C. to 70° C., and the contents were mixed until the contents became homogenous, thereby obtaining an epoxy resin composition.

(Physical Properties and Evaluation)

The hardened product of the epoxy resin composition was evaluated according to the above-described methods. The results are shown in Table 1.

Example 2

(Preparation of Epoxy Resin Composition)

In a planetary mixer, 55 parts by mass of jER807, 35 parts by mass of jER604, 5 parts by mass of MY0510, 5 parts by mass of jER828, and 10 parts by mass of SUMIKAEXCEL 5003P were weighed. The jacket temperature of the planetary mixer was set to 140° C. to 160° C., and the contents were mixed until the contents became homogeneous. The contents were cooled to 60° C. or lower, and 49.5 parts by mass of Aradure 9719-1 was added to the planetary mixer. The jacket temperature was set to 55° C. to 70° C., and the contents were mixed until the contents became homogenous, thereby obtaining an epoxy resin composition.

(Physical Properties and Evaluation)

The hardened product of the epoxy resin composition was evaluated according to the above-described methods. The results are shown in Table 1.

Example 3

(Preparation of Epoxy Resin Composition)

In a planetary mixer, 55 parts by mass of jER807, 35 parts by mass of jER604, 5 parts by mass of MY0510, 5 parts by mass of jER828, and 10 parts by mass of SUMIKAEXCEL 5003P were weighed. The jacket temperature of the planetary mixer was set to 140° C. to 160° C., and the contents were mixed until the contents became homogeneous. The contents were cooled to 60° C. or lower, and 45 parts by mass of Aradure 9719-1 was added to the planetary mixer. The jacket temperature was set to 55° C. to 70° C., and the contents were mixed until the contents became homogenous, thereby obtaining an epoxy resin composition.

(Physical Properties and Evaluation)

The hardened product of the epoxy resin composition was evaluated according to the above-described methods. The results are shown in Table 1.

Example 4

(Preparation of Epoxy Resin Composition)

In a planetary mixer, 55 parts by mass of jER807, 45 parts by mass of jER604, and 10 parts by mass of SUMIKAEXCEL 5003P were weighed. The jacket temperature of the planetary mixer was set to 140° C. to 160° C., and the contents were mixed until the contents became homogeneous. The contents were cooled to 60° C. or lower, and 54.5 parts by mass of Aradure 9719-1 was added to the planetary mixer. The jacket temperature was set to 55° C. to 70° C., and the contents were mixed until the contents became homogenous, thereby obtaining an epoxy resin composition.

(Physical Properties and Evaluation)

The hardened product of the epoxy resin composition was evaluated according to the above-described methods. The results are shown in Table 1.

Example 5

(Preparation of Epoxy Resin Composition)

In a planetary mixer, 55 parts by mass of jER807, 40 parts by mass of jER604, 5 parts by mass of jER828, and 10 parts by mass of SUMIKAEXCEL 5003P were weighed. The jacket temperature of the planetary mixer was set to 140° C. to 160° C., and the contents were mixed until the contents became homogeneous. The contents were cooled to 60° C. or lower, and 53.6 parts by mass of Aradure 9719-1 was added to the planetary mixer. The jacket temperature was set to 55° C. to 70° C., and the contents were mixed until the contents became homogenous, thereby obtaining an epoxy resin composition.

(Physical Properties and Evaluation)

The hardened product of the epoxy resin composition was evaluated according to the above-described methods. The results are shown in Table 1.

Example 6

(Preparation of Epoxy Resin Composition)

In a planetary mixer, 55 parts by mass of jER807, 35 parts by mass of jER604, 10 parts by mass of jER828, and 10 parts by mass of SUMIKAEXCEL 5003P were weighed. The jacket temperature of the planetary mixer was set to 140° C. to 160° C., and the contents were mixed until the contents became homogeneous. The contents were cooled to 60° C. or lower, and 52.4 parts by mass of Aradure 9719-1 was added to the planetary mixer. The jacket temperature was set to 55° C. to 70° C., and the contents were mixed until the contents became homogenous, thereby obtaining an epoxy resin composition.

(Physical Properties and Evaluation)

The hardened product of the epoxy resin composition was evaluated according to the above-described methods. The results are shown in Table 1.

Example 7

(Preparation of Epoxy Resin Composition)

In a planetary mixer, 55 parts by mass of jER807, 35 parts by mass of jER604, 5 parts by mass of MY0510, 5 parts by mass of jER828, and 15 parts by mass of SUMIKAEXCEL 5003P were weighed. The jacket temperature of the planetary mixer was set to 140° C. to 160° C., and the contents were mixed until the contents became homogeneous. The contents were cooled to 60° C. or lower, and 54 parts by mass of Aradure 9719-1 was added to the planetary mixer. The jacket temperature was set to 55° C. to 70° C., and the contents were mixed until the contents became homogenous, thereby obtaining an epoxy resin composition.

(Physical Properties and Evaluation)

The hardened product of the epoxy resin composition was evaluated according to the above-described methods. The results are shown in Table 1.

Example 8

(Preparation of Epoxy Resin Composition)

In a planetary mixer, 55 parts by mass of jER807, 35 parts by mass of jER604, 5 parts by mass of MY0510, 5 parts by mass of jER828, and 5 parts by mass of SUMIKAEXCEL 5003P were weighed. The jacket temperature of the planetary mixer was set to 140° C. to 160° C., and the contents were mixed until the contents became homogeneous. The contents were cooled to 60° C. or lower, and 54 parts by mass of Aradure 9719-1 was added to the planetary mixer. The jacket temperature was set to 55° C. to 70° C., and the contents were mixed until the contents became homogenous, thereby obtaining an epoxy resin composition.

(Physical Properties and Evaluation)

The hardened product of the epoxy resin composition was evaluated according to the above-described methods. The results are shown in Table 1.

Example 9

(Preparation of Epoxy Resin Composition)

In a planetary mixer, 55 parts by mass of jER807, 35 parts by mass of jER604, 5 parts by mass of MY0510, 5 parts by mass of jER828, and 15 parts by mass of SUMIKAEXCEL 5003P were weighed. The jacket temperature of the planetary mixer was set to 140° C. to 160° C., and the contents were mixed until the contents became homogeneous. The contents were cooled to 60° C. or lower, and 54 parts by mass of Aradure 9719-1 was added to the planetary mixer. The jacket temperature was set to 55° C. to 70° C., the contents were mixed until the contents became homogenous, furthermore, 20.9 parts by mass of VESTOSINT 2158 was added thereto, and the contents were mixed until the contents became homogenous, thereby obtaining an epoxy resin composition.

(Production of Prepreg)

The epoxy resin composition having a viscosity decreased by heating the epoxy resin composition to 55° C. to 70° C. was applied onto exfoliate paper using a roll coater in a thickness in which the resin amount rate (Rc) of a prepreg to be produced reached 34 mass %, thereby obtaining a film of the epoxy resin composition. The films of the epoxy resin composition were attached to the upper surface and the lower surface of a carbon fiber sheet in which a plurality of carbon fibers A was paralleled in one direction such that FAW reached 190 g/m$^2$, and the films and the carbon fiber sheet were heated and pressurized with a heating roll at 90° C. to 130° C. to impregnate the carbon fiber sheet with the epoxy resin composition, thereby obtaining a prepreg.

(Production of Carbon Fiber Composite Material)

A carbon fiber composite material for physical property evaluation was obtained according to the above-described method.

(Physical Properties and Evaluation)

The hardened product of the epoxy resin composition was evaluated according to the above-described methods. The results are shown in Table 3. Here, in Table 3, "O" means that the carbon fiber A was used as the component (D).

Example 10

(Preparation of Epoxy Resin Composition)

In a planetary mixer, 50 parts by mass of jER807, 40 parts by mass of jER604, 10 parts by mass of TRS-400, and 8 parts by mass of SUMIKAEXCEL 5003P were weighed. The jacket temperature of the planetary mixer was set to 140° C. to 160° C., and the contents were mixed until the contents became homogeneous. The contents were cooled to 60° C. or lower, and 51.5 parts by mass of Aradure 9719-1 was added to the planetary mixer. The jacket temperature was set to 55° C. to 70° C., and the contents were mixed until the contents became homogenous, thereby obtaining an epoxy resin composition.

(Physical Properties and Evaluation)

The hardened product of the epoxy resin composition was evaluated according to the above-described methods. The results are shown in Table 1.

Example 11

(Preparation of Epoxy Resin Composition)

In a planetary mixer, 50 parts by mass of jER807, 40 parts by mass of jER604, 10 parts by mass of TRS-400, and 8 parts by mass of SUMIKAEXCEL 5003P were weighed. The jacket temperature of the planetary mixer was set to 140° C. to 160° C., and the contents were mixed until the contents became homogeneous. The contents were cooled to 60° C. or lower, and 51.5 parts by mass of Aradure 9719-1 was added to the planetary mixer. The jacket temperature was set to 55° C. to 70° C., the contents were mixed until the contents became homogenous, furthermore, 20.2 parts by mass of VESTOSINT 2158 was added thereto, and the contents were mixed until the contents became homogenous, thereby obtaining an epoxy resin composition.

(Production of Prepreg)

A prepreg was obtained by impregnating the carbon fiber sheet with the epoxy resin composition by the same method as in Example 9.

(Production of Carbon Fiber Composite Material)

A carbon fiber composite material for physical property evaluation was obtained according to the above-described method.

(Physical Properties and Evaluation)

The hardened product of the epoxy resin composition was evaluated according to the above-described methods. The results are shown in Table 3. Here, in Table 3, "O" means that the carbon fiber A was used as the component (D).

Comparative Example 1

(Preparation of Epoxy Resin Composition)

In a planetary mixer, 50 parts by mass of jER807, 50 parts by mass of MY0600, 5 parts by mass of jER828, and 21 parts by mass of SUMIKAEXCEL 5003P were weighed. The jacket temperature of the planetary mixer was set to 140° C. to 160° C., and the contents were mixed until the contents became homogeneous. The contents were cooled to 60° C. or lower, and 59.8 parts by mass of Aradure 9719-1 was added to the planetary mixer. The jacket temperature was set to 55° C. to 70° C., and the contents were mixed until the contents became homogenous, thereby obtaining an epoxy resin composition.

(Physical Properties and Evaluation)

The hardened product of the epoxy resin composition was evaluated according to the above-described methods. The results are shown in Table 2.

Comparative Example 2

(Preparation of Epoxy Resin Composition)

In a planetary mixer, 50 parts by mass of jER807, 50 parts by mass of MY0600, 5 parts by mass of jER828, and 21 parts by mass of SUMIKAEXCEL 5003P were weighed. The jacket temperature of the planetary mixer was set to 140° C. to 160° C., and the contents were mixed until the contents became homogeneous. The contents were cooled to 60° C. or lower, and 55 parts by mass of Aradure 9719-1 was added to the planetary mixer. The jacket temperature was set to 55° C. to 70° C., and the contents were mixed until the contents became homogenous, thereby obtaining an epoxy resin composition.

(Physical Properties and Evaluation)

The hardened product of the epoxy resin composition was evaluated according to the above-described methods. The results are shown in Table 2.

Comparative Example 3

(Preparation of Epoxy Resin Composition)

In a planetary mixer, 50 parts by mass of jER807, 50 parts by mass of MY0600, 5 parts by mass of jER828, and 21 parts by mass of SUMIKAEXCEL 5003P were weighed. The jacket temperature of the planetary mixer was set to 140° C. to 160° C., and the contents were mixed until the contents became homogeneous. The contents were cooled to 60° C. or lower, and 47 parts by mass of Aradure 9719-1 was added to the planetary mixer. The jacket temperature was set to 55° C. to 70° C., and the contents were mixed until the contents became homogenous, thereby obtaining an epoxy resin composition.

(Physical Properties and Evaluation)

The hardened product of the epoxy resin composition was evaluated according to the above-described methods. The results are shown in Table 2.

Comparative Example 4

(Preparation of Epoxy Resin Composition)

In a planetary mixer, 10 parts by mass of jER807, 90 parts by mass of jER604, and 4.3 parts by mass of SUMIKAEXCEL 5003P were weighed. The jacket temperature of the planetary mixer was set to 140° C. to 160° C., and the contents were mixed until the contents became homogeneous. The contents were cooled to 60° C. or lower, and 35 parts by mass of Aradure 9719-1 was added to the planetary mixer. The jacket temperature was set to 55° C. to 70° C., and the contents were mixed until the contents became homogenous, thereby obtaining an epoxy resin composition.

(Physical Properties and Evaluation)

The hardened product of the epoxy resin composition was evaluated according to the above-described methods. The results are shown in Table 2.

Comparative Example 5

(Preparation of Epoxy Resin Composition)

In a planetary mixer, 55 parts by mass of jER807, 35 parts by mass of jER604, 5 parts by mass of MY0510, 5 parts by mass of jER828, and 10 parts by mass of SUMIKAEXCEL 5003P were weighed. The jacket temperature of the planetary mixer was set to 140° C. to 160° C., and the contents were mixed until the contents became homogeneous. The contents were cooled to 60° C. or lower, and 39 parts by mass of Aradure 9719-1 was added to the planetary mixer. The jacket temperature was set to 55° C. to 70° C., and the contents were mixed until the contents became homogenous, thereby obtaining an epoxy resin composition.

(Physical Properties and Evaluation)

The hardened product of the epoxy resin composition was evaluated according to the above-described methods. The results are shown in Table 2.

Comparative Example 6

(Preparation of Epoxy Resin Composition)

In a planetary mixer, 55 parts by mass of jER807, 35 parts by mass of jER604, 5 parts by mass of MY0510, 5 parts by mass of jER828, and 10 parts by mass of SUMIKAEXCEL 5003P were weighed. The jacket temperature of the planetary mixer was set to 140° C. to 160° C., and the contents were mixed until the contents became homogeneous. The contents were cooled to 60° C. or lower, and 60.5 parts by mass of Aradure 9719-1 was added to the planetary mixer. The jacket temperature was set to 55° C. to 70° C., and the contents were mixed until the contents became homogenous, thereby obtaining an epoxy resin composition.

(Physical Properties and Evaluation)

The hardened product of the epoxy resin composition was evaluated according to the above-described methods. The results are shown in Table 2.

Comparative Example 7

(Preparation of Epoxy Resin Composition)

In a planetary mixer, 35 parts by mass of jER807, 65 parts by mass of jER604, 5 parts by mass of jER828, and 10 parts by mass of SUMIKAEXCEL 5003P were weighed. The jacket temperature of the planetary mixer was set to 140° C. to 160° C., and the contents were mixed until the contents became homogeneous. The contents were cooled to 60° C. or lower, and 58 parts by mass of Aradure 9719-1 was added to the planetary mixer. The jacket temperature was set to 55° C. to 70° C., and the contents were mixed until the contents became homogenous, thereby obtaining an epoxy resin composition.

(Physical Properties and Evaluation)

The hardened product of the epoxy resin composition was evaluated according to the above-described methods. The results are shown in Table 2.

Comparative Example 8

(Preparation of Epoxy Resin Composition)

In a planetary mixer, 75 parts by mass of jER807, 25 parts by mass of jER604, and 10 parts by mass of SUMIKAEXCEL 5003P were weighed. The jacket temperature of the planetary mixer was set to 140° C. to 160° C., and the contents were mixed until the contents became homogeneous. The contents were cooled to 60° C. or lower, and 51 parts by mass of Aradure 9719-1 was added to the planetary mixer. The jacket temperature was set to 55° C. to 70° C., and the contents were mixed until the contents became homogenous, thereby obtaining an epoxy resin composition.

(Physical Properties and Evaluation)

The hardened product of the epoxy resin composition was evaluated according to the above-described methods. The results are shown in Table 2.

Comparative Example 9

(Preparation of Epoxy Resin Composition)

In a planetary mixer, 55 parts by mass of jER807, 35 parts by mass of jER604, 5 parts by mass of MY0510, 5 parts by mass of jER828, and 15 parts by mass of SUMIKAEXCEL 5003P were weighed. The jacket temperature of the planetary mixer was set to 140° C. to 160° C., and the contents were mixed until the contents became homogeneous. The contents were cooled to 60° C. or lower, and 54 parts by mass of SEIKACURE-S was added to the planetary mixer. The jacket temperature was set to 55° C. to 70° C., and the contents were mixed until the contents became homogenous, thereby obtaining an epoxy resin composition.

(Physical Properties and Evaluation)

The hardened product of the epoxy resin composition was evaluated according to the above-described methods. The results are shown in Table 2.

Comparative Example 10

(Preparation of Epoxy Resin Composition)

In a planetary mixer, 55 parts by mass of jER807, 35 parts by mass of jER604, 5 parts by mass of MY0510, 5 parts by mass of jER828, and 10 parts by mass of SUMIKAEXCEL 5003P were weighed. The jacket temperature of the planetary mixer was set to 140° C. to 160° C., and the contents were mixed until the contents became homogeneous. The contents were cooled to 60° C. or lower, and 44.1 parts by mass of Aradure 9719-1 was added to the planetary mixer. The jacket temperature was set to 55° C. to 70° C., and the contents were mixed until the contents became homogenous, thereby obtaining an epoxy resin composition.

(Physical properties and evaluation) The hardened product of the epoxy resin composition was evaluated according to the above-described methods. The results are shown in Table 2.

In all of Examples 1 to 8 and 10 including the component (A), the component (B), and the component (C) in the scope of the present invention, the hardened product of the epoxy resin composition had a high bending elastic modulus and high fracture strain. Furthermore, in Examples 1 to 8, the water absorption rate of the hardened product of the epoxy resin composition was low, and thus G'-Tg Wet was high, and the difference from G'-Tg Dry was also small.

In all of Comparative Examples 1 to 4 and 7 including a large amount of the component (B), the hardened product of the epoxy resin composition had a high water absorption rate, and thus G'-Tg Wet was low or the difference from G'-Tg Dry became large. Furthermore, in Comparative Examples 1, 4, and 7, the hardened product of the epoxy resin composition had low fracture strain and poor toughness.

In Comparative Examples 5 and 10 in which the content of the component (C) was small and Expression (1) was not satisfied, the water absorption rate of the hardened product of the epoxy resin composition was high, and thus G'-Tg Wet was low, and the difference from G'-Tg Dry became large. In Comparative Example 6 in which the content of the component (C) was large and Expression (1) was not satisfied, the values of G'-Tg Dry and G'-Tg Wet became low.

In Comparative Example 9 not including the component (C), the bending elastic modulus of the hardened product of the epoxy resin composition was low, and the water absorption rate of the hardened product of the epoxy resin composition also became high.

Additionally, in the carbon fiber composite materials made up of the epoxy resin composition of Example 9 or 11 including the component (A), the component (B), and the component (C) in the scope of the present invention and the carbon fiber A, the epoxy resin composition had a low water absorption rate and a high elastic modulus, and thus a high 0° compressive strength was exhibited regardless of the occurrence of moisture absorption. Furthermore, in the carbon fiber composite materials made up of the epoxy resin composition of Example 9 or 11 and the carbon fiber A, the toughness of the epoxy resin composition was high, and the component (E) was unevenly distributed on the surface. Therefore, a high interlaminar toughness value was exhibited.

TABLE 1

| | | | Example 1 | Example 2 | Example 3 | Example 4 | Example 5 | Example 6 | Example 7 | Example 8 | Example 10 |
|---|---|---|---|---|---|---|---|---|---|---|---|
| Component (A) | jER807 | | 55 | 55 | 55 | 55 | 55 | 55 | 55 | 55 | 50 |
| Component (B) | jER604 | | 35 | 35 | 35 | 45 | 40 | 35 | 35 | 35 | 40 |
| | MY0510 | | 5 | 5 | 5 | 0 | 0 | 0 | 5 | 5 | 0 |
| Other epoxy | jER828 | | 5 | 5 | 5 | 0 | 5 | 10 | 5 | 5 | 0 |
| resins | TSR-400 | | 0 | 0 | 0 | 0 | 0 | 0 | 0 | 0 | 10 |
| Component (C) | Aradure9719-1 | | 54 | 49.5 | 45 | 54.5 | 53.6 | 52.4 | 54 | 54 | 51.5 |
| Random component | SUMIKAEXCEL 5003P | | 10 | 10 | 10 | 10 | 10 | 10 | 15 | 5 | 8 |
| | x/y | | 1.25 | 1.15 | 1.04 | 1.25 | 1.25 | 1.25 | 1.25 | 1.25 | 1.25 |
| Three-point bending test of hardened product of epoxy resin composition | Bending strength | (MPa) | 206 | 204 | 199 | 206 | 202 | 202 | 203 | 205 | 209 |
| | Bending elastic modulus | (GPa) | 4.16 | 4.12 | 4.07 | 4.22 | 4.15 | 4.11 | 4.00 | 4.18 | 4.19 |
| | Fracture strain | (%) | 11.2 | 11.8 | 9.0 | 10.5 | 11.5 | 10.4 | 11.9 | 11.1 | 11.1 |
| Glass transition temperature of hardened product of epoxy resin composition | G'-Tg Dry | (° C.) | 164 | 170 | 176 | 164 | 162 | 167 | 167 | 164 | 166 |
| | G'-Tg Wet | (° C.) | 121 | 126 | 130 | 124 | 122 | 122 | 129 | 120 | 122 |
| Water absorption rate of hardened product of epoxy resin composition | | (%) | 3.23 | 3.26 | 3.28 | 3.24 | 3.19 | 3.19 | 3.02 | 3.26 | 3.19 |

TABLE 2

| | | | Comparative Example 1 | Comparative Example 2 | Comparative Example 3 | Comparative Example 4 | Comparative Example 5 | Comparative Example 6 |
|---|---|---|---|---|---|---|---|---|
| Component (A) | jER807 | | 50 | 50 | 50 | 10 | 55 | 55 |
| Component (B) | jER604 | | 0 | 0 | 0 | 90 | 35 | 35 |
| | MY0510 | | 0 | 0 | 0 | 0 | 5 | 5 |
| | MY0600 | | 50 | 50 | 50 | 0 | 0 | 0 |
| Other epoxy resins | jER828 | | 0 | 0 | 0 | 0 | 5 | 5 |
| | TSR-400 | | 0 | 0 | 0 | 0 | 0 | 0 |
| Component (C) | Aradure9719-1 | | 59.8 | 55 | 47 | 35 | 39 | 60.5 |
| Other hardening agent | SEIKACURE-S | | 0 | 0 | 0 | 0 | 0 | 0 |
| Random component | SUMIKAEXCEL 5003P | | 21 | 21 | 21 | 4.3 | 10 | 10 |
| | x/y | | 1.25 | 1.15 | 0.98 | 0.70 | 0.90 | 1.40 |
| Three-point bending test of hardened product of epoxy resin | Bending strength | (MPa) | 209 | 217 | 216 | 204 | 206 | 214 |
| | Bending elastic modulus | (GPa) | 4.26 | 4.23 | 4.2 | 4.22 | 4.03 | 4.33 |

TABLE 2-continued

|  |  |  |  |  |  |  |  |  |
|---|---|---|---|---|---|---|---|---|
| composition | Fracture strain | (%) | 8.1 | 10.2 | 10.5 | 6.4 | 11.0 | 10.2 |
| Glass transition temperature of hardened product of epoxy resin composition | G'-Tg Dry | (° C.) | 163 | 167 | 173 | 216 | 182 | 157 |
|  | G'-Tg Wet | (° C.) | 106 | 108 | 114 | 149 | 127 | 107 |
| Water absorption rate of hardened product of epoxy resin composition |  | (%) | 3.66 | 3.77 | 3.90 | 4.03 | 3.38 | 3.17 |

|  |  |  | Comparative Example 7 | Comparative Example 8 | Comparative Example 9 | Comparative Example 10 |
|---|---|---|---|---|---|---|
| Component (A) | jER807 |  | 35 | 75 | 55 | 55 |
| Component (B) | jER604 |  | 65 | 25 | 35 | 35 |
|  | MY0510 |  | 0 | 0 | 5 | 5 |
|  | MY0600 |  | 0 | 0 | 0 | 0 |
| Other epoxy resins | jER828 |  | 0 | 0 | 5 | 5 |
|  | TSR-400 |  | 0 | 0 | 0 | 0 |
| Component (C) | Aradure9719-1 |  | 58 | 51 | 0 | 44.1 |
| Other hardening agent | SEIKACURE-S |  | 0 | 0 | 54 | 0 |
| Random component | SUMIKAEXCEL 5003P |  | 10 | 10 | 15 | 10 |
|  | x/y |  | 1.25 | 1.25 | 0 | 1.02 |
| Three-point bending test of hardened product of epoxy resin composition | Bending strength | (MPa) | 223 | 206 | 169 | 199 |
|  | Bending elastic modulus | (GPa) | 4.39 | 4.04 | 3.40 | 3.81 |
|  | Fracture strain | (%) | 8.2 | 10.8 | 11.9 | 8.1 |
| Glass transition temperature of hardened product of epoxy resin composition | G'-Tg Dry | (° C.) | 186 | 155 | 202 | 172 |
|  | G'-Tg Wet | (° C.) | 123 | 102 | 144 | 115 |
| Water absorption rate of hardened product of epoxy resin composition |  | (%) | 3.55 | 3.01 | 3.92 | 3.61 |

TABLE 3

|  |  |  | Example 9 | Example 11 |
|---|---|---|---|---|
| Component (A) | jER807 |  | 55 | 50 |
| Component (B) | jER604 |  | 35 | 40 |
|  | MY0510 |  | 5 | 0 |
| Other epoxy resins | jER828 |  | 5 | 0 |
|  | TSR-400 |  | 0 | 10 |
| Component (C) | Aradure9719-1 |  | 54 | 51.5 |
| Random component | SUMIKAEXCEL 5003P |  | 15 | 8 |
| Component (E) | VESTOSINT2158 |  | 20.9 | 20.2 |
|  | x/y |  | 1.25 | 1.25 |
| Component (D) | Carbon fiber A |  | O | O |
| Prepreg | FAW | (g/m²) | 190 | 190 |
|  | Rc | (mass %) | 34 | 34 |
|  | Concentration rate of component (E) | (%) | 92 | 89 |
| Carbon fiber composite material | 0° compressive strength RTA | (MPa) | 1598 | 1576 |
|  | 0° compressive strength HTW | (GPa) | 1403 | 1256 |
|  | GIc | (kJ/m²) | 0.71 | 0.66 |
|  | GIIc | (kJ/m²) | 2.48 | 2.90 |

INDUSTRIAL APPLICABILITY

According to the epoxy resin composition for a carbon-fiber-reinforced composite material of the present invention, it is possible to obtain a carbon-fiber-reinforced composite material in which the compression characteristics at high temperatures in a moisture absorption state are excellent and the difference between the compression characteristics at room temperature in a non-moisture absorption state and the compression characteristics at high temperatures in a moisture absorption state is small.

According to the prepreg of the present invention, it is possible to obtain a carbon-fiber-reinforced composite material in which the compression characteristics at high temperatures in a moisture absorption state are excellent and the difference between the compression characteristics at room temperature in a non-moisture absorption state and the compression characteristics at high temperatures in a moisture absorption state is small.

The carbon-fiber-reinforced composite material of the present invention has excellent compression characteristics at high temperatures in a moisture absorption state and has a small difference between the compression characteristics at room temperature in a non-moisture absorption state and the compression characteristics at high temperatures in a moisture absorption state.

REFERENCE SIGNS LIST

10 Long fluororesin film, 20 Prepreg laminate, d Width, X Fiber axis direction of reinforcing fiber.

The invention claimed is:

1. A carbon fiber prepreg, comprising:
an epoxy resin composition comprising the follow components (A)-(C):
a component (A): bisphenol F epoxy resin that is liquid at 25° C.,
a component (B): at least one of tetraglycidyl diaminodiphenylmethane and triglycidyl aminophenol, and
a component (C): 3,3'-diaminodiphenyl sulfone;
sheet of carbon fiber base material; and
fusible polyamide resin particles,
wherein
with respect to 100 parts by mass of all epoxy resins in the epoxy resin composition, a sum of a content of the component (A) and a content of the component (B) is 85 to 100 parts by mass, the content of the component (A) is 40 to 60 parts by mass, and the content of the component (B) is 30 to 45 parts by mass; and
a content of the component (C) satisfies Expression (1):

$$1.04 \leq x/y \leq 1.35 \tag{1}$$

where x is a molar number of active hydrogen atoms in an amine in the component (C) and y is a molar number of all epoxy groups in the epoxy resin composition.

2. The carbon fiber prepreg according to claim 1, wherein the content of the component (C) satisfies $1.04 \leq x/y \leq 1.31$.

3. The carbon fiber prepreg according to claim 1, wherein a content of the fusible polyamide resin particles is 5 to 25 parts by mass with respect to 100 parts by mass of the epoxy resin composition.

4. The carbon fiber prepreg according to claim 1, wherein the fusible polyamide resin particles have a melting point of 140° C. to 180° C.

5. The carbon fiber prepreg according to claim 1, wherein the fusible polyamide resin particles have a glass transition temperature of 140° C. to 180° C.

6. The carbon fiber prepreg according to claim 1, wherein the fusible polyamide resin particles are unevenly distributed on a surface of the carbon fiber prepreg.

7. A hardened product of a laminate, comprising:
two or more laminated sheets of the carbon fiber prepreg according to claim 1.

8. A composition, comprising:
an epoxy resin composition comprising the following components (A)-(C):
a component (A): bisphenol F epoxy resin that is liquid at 25° C.,
a component (B): at least one of tetraglycidyl diaminodiphenylmethane and triglycidyl aminophenol, and
a component (C): 3,3'-diaminodiphenyl sulfone; and
fusible polyamide resin particles,
wherein
with respect to 100 parts by mass of all epoxy resins in the epoxy resin composition, a sum of a content of the component (A) and a content of the component (B) is 85 to 100 parts by mass, the content of the component (A) is 40 to 60 parts by mass, and the content of the component (B) is 30 to 45 parts by mass; and
a content of the component (C) satisfies Expression (1):

$$1.04 \leq x/y \leq 1.35 \tag{1}$$

where x is a molar number of active hydrogen atoms in an amine in the component (C) and y is a molar number of all epoxy groups in the epoxy resin composition.

9. The composition according to claim 8, wherein the content of the component (C) satisfies $1.04 \leq x/y \leq 1.31$.

10. The composition according to claim 8, wherein a hardened product of the composition has a water absorption rate of 3.3% or less.

11. The composition according to claim 8, wherein the component (B) is a mixture of triglycidyl aminophenol and tetraglycidyl diaminodiphenylmethane.

12. The composition according to claim 11, wherein a mass ratio of triglycidyl aminophenol to tetraglycidyl diaminodiphenylmethane in the mixture is less than or equal to 2.

13. A carbon fiber prepreg, comprising:
the composition according to claim 8; and
a carbon fiber.

14. A carbon-fiber-reinforced composite material, comprising:
an epoxy resin composition comprising the following components (A)-(C):
a component (A): bisphenol F epoxy resin that is liquid at 25° C.,
a component (B): at least one of tetraglycidyl diaminodiphenylmethane and triglycidyl aminophenol, and
a component (C): 3,3'-diaminodiphenyl sulfone;
plural sheets of carbon fiber base material that are laminated; and
polyamide resin particles that are fused and solidified and are present between layers of the plural sheets of the carbon fiber base material,
wherein
with respect to 100 parts by mass of all epoxy resins in the epoxy resin composition, a sum of a content of the component (A) and a content of the component (B) is 85 to 100 parts by mass, the content of the component (A) is 40 to 60 parts by mass, and the content of the component (B) is 30 to 45 parts by mass; and
a content of the component (C) satisfies Expression (1):

$$1.04 \leq x/y \leq 1.35 \tag{1}$$

where x is a molar number of active hydrogen atoms in an amine in the component (C) and y is a molar number of all epoxy groups in the epoxy resin composition.

15. The carbon-fiber-reinforced composite material according to claim 14, wherein the content of the component (C) satisfies $1.04 \leq x/y \leq 1.31$.

* * * * *